(12) United States Patent
Jang et al.

(10) Patent No.: US 10,935,837 B2
(45) Date of Patent: Mar. 2, 2021

(54) WIRE GRID PATTERN, DISPLAY DEVICE INCLUDING THE SAME, AND METHOD FOR FABRICATING THE SAME

(71) Applicant: Samsung Display Co., Ltd., Yongin-si (KR)

(72) Inventors: Dae-Hwan Jang, Seoul (KR); Seung Won Park, Seoul (KR); Tae Woo Kim, Seoul (KR); Jung Gun Nam, Suwon-si (KR); Dae Young Lee, Seoul (KR); Gug Rae Jo, Asan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/737,893

(22) Filed: Jan. 8, 2020

(65) Prior Publication Data

US 2020/0150486 A1     May 14, 2020

Related U.S. Application Data

(63) Continuation of application No. 15/683,780, filed on Aug. 23, 2017, now Pat. No. 10,558,077.

(30) Foreign Application Priority Data

Aug. 23, 2016  (KR) .................. 10-2016-0107075

(51) Int. Cl.
*G02F 1/1335* (2006.01)
*G02F 1/1333* (2006.01)
(Continued)

(52) U.S. Cl.
CPC ..... *G02F 1/133528* (2013.01); *G02B 5/3058* (2013.01); *G02F 1/133308* (2013.01); *G02F 2001/133548* (2013.01); *H05B 45/46* (2020.01)

(58) Field of Classification Search
None
See application file for complete search history.

(56) References Cited

U.S. PATENT DOCUMENTS

| 5,772,905 A | 6/1998 | Chou |
| 6,842,229 B2 | 1/2005 | Sreenivasan et al. |
| (Continued) | | |

FOREIGN PATENT DOCUMENTS

| CN | 105022111 | 11/2015 |
| CN | 105607174 | 5/2016 |
| (Continued) | | |

OTHER PUBLICATIONS

Non-Final Office Action dated Jan. 11, 2019 issued on U.S. Appl. No. 15/683,780.

(Continued)

*Primary Examiner* — Edward J Glick
*Assistant Examiner* — Anthony G Quash
(74) *Attorney, Agent, or Firm* — H.C. Park & Associates, PLC

(57) ABSTRACT

A wire grid pattern used as a wire grid polarizer included in a display device or a master substrate for fabricating the wire gird polarizer includes a substrate; a cell area having a plurality of cells, each of the plurality of cells having a plurality of wires protruding from the substrate and arranged in a substantially parallel relationship at regular intervals; and a bezel area disposed along a periphery of the cell area. The cell area includes a trench area separating at least some of the cells. A method for fabricating the wire grid pattern also is disclosed.

8 Claims, 34 Drawing Sheets

(51) Int. Cl.
*G02F 1/03* (2006.01)
*G02B 5/30* (2006.01)
*H05B 45/46* (2020.01)

(56) References Cited

U.S. PATENT DOCUMENTS

| | | | |
|---|---|---|---|
| 7,351,346 B2 | 4/2008 | Little | |
| 7,561,332 B2 | 7/2009 | Little et al. | |
| 8,033,814 B2 | 10/2011 | Bailey et al. | |
| 8,387,482 B2 | 3/2013 | Choi et al. | |
| 8,609,326 B2 | 12/2013 | Sreenivasan et al. | |
| 9,223,202 B2 | 12/2015 | Choi et al. | |
| 9,442,236 B2 | 9/2016 | Takakuwa et al. | |
| 9,452,574 B2 | 9/2016 | Resnick et al. | |
| 9,470,829 B2 | 10/2016 | Kim et al. | |
| 9,599,759 B2 | 3/2017 | Hatanaka | |
| 9,939,570 B2 | 4/2018 | Kim et al. | |
| 10,295,717 B2 | 5/2019 | Kim et al. | |
| 2008/0117509 A1* | 5/2008 | Hayashi | G02B 5/3058 359/485.05 |
| 2013/0300986 A1* | 11/2013 | Kang | G02B 5/3058 349/96 |
| 2016/0033818 A1 | 2/2016 | Lee et al. | |
| 2016/0114502 A1 | 4/2016 | Han et al. | |
| 2016/0139313 A1* | 5/2016 | Kim | G02B 5/3058 359/485.05 |
| 2018/0024399 A1* | 1/2018 | Han | G02B 5/3058 349/43 |

FOREIGN PATENT DOCUMENTS

| | | | |
|---|---|---|---|
| CN | 105700056 | 6/2016 | |
| JP | 2003043469 | 2/2003 | |
| JP | 2003043469 A * | 2/2003 | G02B 5/30 |
| JP | 2010-87526 | 4/2010 | |
| KR | 10-2006-0088741 | 8/2006 | |
| KR | 10-2007-0091314 | 9/2007 | |
| KR | 10-2013-0052942 | 5/2013 | |
| KR | 10-2014-0117425 | 10/2014 | |
| WO | 2007/044028 | 4/2007 | |
| WO | 2013/096459 | 6/2013 | |

OTHER PUBLICATIONS

Final Office Action dated Jul. 29, 2019 issued on U.S. Appl. No. 15/683,780.

Notice of Allowance dated Oct. 9, 2019, issued on U.S. Appl. No. 15/683,780.

\* cited by examiner

WIRE GRID PATTERN, DISPLAY DEVICE INCLUDING THE SAME, AND METHOD FOR FABRICATING THE SAME

CROSS-REFERENCE TO RELATED APPLICATIONS

This application is a Continuation of U.S. patent application Ser. No. 15/683,780, filed on Aug. 23, 2017, which claims priority from and the benefit of Korean Patent Application No. 10-2016-0107075, filed on Aug. 23, 2016, which is hereby incorporated by reference for all purposes as if fully set forth herein.

BACKGROUND

Field

The invention relates generally to display devices, and, more particularly, to a wire grid pattern used to polarize light emitted from pixels in a display device, and a method for fabricating the same, which reduces defects in the display.

Discussion of the Background

In display devices such as LCD devices, a polarizer is frequently employed to control polarization of the light in the display devices. The polarizer converts natural light into a single polarized light propagating in a straight line.

In LCD devices, film type polarizers are commonly employed to generate polarized light. Such a polarizer film may be a stack of two TAC (tri-acetyl-cellulose) films and a PVA (polyvinyl-alcohol) film. However, the characteristics of the polarizer film may be easily changed under high humidity and temperature.

To overcome such shortcoming of polarizer films, a nano-sized, wire grid polarizer having a metal pattern in nanoscale on a glass substrate has been proposed and is attracting attention as a better alternative than polarizer film.

In particular, to form a nano-sized, wire grid polarizer having a metal pattern in nanoscale, a nano-imprint technology has been proposed, which has high accuracy.

As LCD devices become larger, wire grid polarizers also become larger. Fabricating a large wire grid polarizer requires a large nano-imprint mold, which is difficult and expensive to fabricate.

Fabricating a large wire grid polarizer by way of repeating the process of forming a small metal pattern in nanoscale using a small mold has been proposed. However, this approach has a problem that a difference occurs in the connection area (e.g., stitch line) between the metal patterns in nanoscale, whereby the polarization property degrades so that the performance of the polarizer may deteriorate.

The above information disclosed in this Background section is only for enhancement of understanding of the background of the inventive concepts, and, therefore, it is may contain information that does not form prior art.

SUMMARY

One or more exemplary embodiments of the invention provide a wire grid pattern including a trench area between cells comprising wire patterns to suppress defects in a wire grid pattern that occur during fabrication, and a method for fabricating the trench areas and cells.

One or more exemplary embodiments of the invention also provide a display device including the wire grid pattern constructed according to the inventive concepts.

Additional aspects will be set forth in the detailed description which follows, and, in part, will be apparent from the disclosure, or may be learned by practice of the inventive concepts.

According to one aspect of the invention, a wire grid pattern used as a wire grid polarizer included in a display device or a master substrate for fabricating the wire gird polarizer includes a substrate; a cell area having a plurality of cells, each of the plurality of cells having a plurality of wires protruding from the substrate and arranged in a substantially parallel relationship at regular intervals; and a bezel area disposed along a periphery of the cell area, which includes a trench area separating at least some of the plurality of cells.

At least some of the cells may further include slits separating adjacent wires by a predetermined spacing.

A line width of the wires may range from about 40 nm to about 50 nm, a spacing between the slits ranges from about 40 nm to about 50 nm, and a pitch that is a sum of the line width and the spacing ranges from about 80 nm to about 100 nm.

The trench area may include at least one of a protruding pattern that projects outwardly with respect to a surface of the substrate, a sink pattern that is recessed into a top surface of the wires toward the surface of the substrate, and a sink-protruding pattern having a projecting portion with respect to the surface of the substrate and a recessed portion with respect to the top surface of the wires.

The protruding pattern may have a height substantially equal to that of the wires, and may be connected to ends of the wires in a longitudinal direction.

The sink pattern may have a spacing different from the spacing between slits separating the wires, and may be connected to ends of the slits in a longitudinal direction.

The projecting portion of the sink-protruding pattern may be connected to a side surface of an adjacent wire and connected to at least one end of each of the wires in the longitudinal direction, and the recessed portion of the sink-protruding pattern may separate at least some of the cells with the projecting portion therebetween and may separate at least one end of the wires in the longitudinal direction from another.

The wire grid pattern may further include a bank area disposed on at least a part of an area between the cell area and the bezel area.

The bank area may be connected to ends of the wires in the outermost cells of the cell area in a longitudinal direction, and a width of the bank area may be substantially equal to or larger than a width of the trench area.

According to another aspect of the invention, a method for fabricating a wire grid pattern for a wire grid polarizer included in a display device or a master substrate for fabricating the wire gird polarizer includes disposing a first metal layer on a first substrate and forming a moat in the first metal layer to separate the first metal layer into at least two section; applying a first resin onto the first metal layer on a side of the moat to form a first resin layer, and transferring a pattern to the first resin layer to form a first resin pattern; applying a second resin on the first metal layer on the other side of the moat to form a second resin layer, and transferring a pattern to the second resin layer to form a second resin pattern; catching excessive resin from at least one of the first resin and the second resin in the moat during at least one of the steps of transferring the patterns to the first and second resin layers to form first and second resin patterns; and etching the first metal layer by using the first resin pattern and the second resin pattern as masks to form a wire pattern having a plurality of wires.

The step of transferring the pattern to the first resin layer to form the first resin pattern may include forming the first resin pattern by bringing or pressing a stamp into contact with or against the first resin layer.

The step of pressing the stamp against the first resin layer may include pressing the first resin by a roll process, wherein the roll is moved toward the moat.

The first resin may be applied by inkjet printing.

The method may further include forming a bank area on at least one side of a periphery of the first substrate during the step of forming the moat.

A width of the moat may be larger than a width of the wires.

The first resin pattern and the second resin pattern may be formed in a single step.

The method may further include applying a third resin onto a second substrate; bringing the substrate having the wire pattern into contact with the third resin to transfer the wire pattern to the third resin; and detaching the second substrate from the first substrate to form a replica substrate having a third resin pattern on the second substrate.

The method may further include forming a third metal layer on a third substrate and then a fourth resin layer on the third metal layer; bringing the replica substrate into contact with the fourth resin layer and transferring the third resin pattern to form a fourth resin pattern; and etching the third metal layer by using the fourth resin pattern as a mask.

According to a further aspect of the invention, a display device includes a wire grid pattern to polarize light; a protective layer disposed on the wire grid pattern; a gate line formed on the protective layer and extending in a first direction; a data line insulated from the gate line and extending in a second direction; a thin-film transistor electrically connected to the gate line and the data line; and a pixel electrode electrically connected to the thin-film transistor and disposed in a transmissive area. The wire grid pattern includes a plurality of cells at least some of which have a plurality of wires arranged at regular intervals in a direction, and slits separating adjacent wires from one another by a predetermined gap; and at least one trench area separating the cells into section, wherein the cells are aligned with the transmissive area and the at least one trench area is aligned with a non-transmissive area.

The non-transmissive area may correspond to at least one of the data line, the gate line, the thin-film transistor, a sustain electrode and a black matrix.

The wire grid pattern may include a bezel area at its periphery, wherein a bank area may be formed at the bezel area.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concepts, and are incorporated in and constitute a part of this specification, illustrate exemplary embodiments of the inventive concepts, and, together with the description, serve to explain principles of the inventive concepts.

DETAILED DESCRIPTION OF THE ILLUSTRATED EMBODIMENTS

Figure 1:
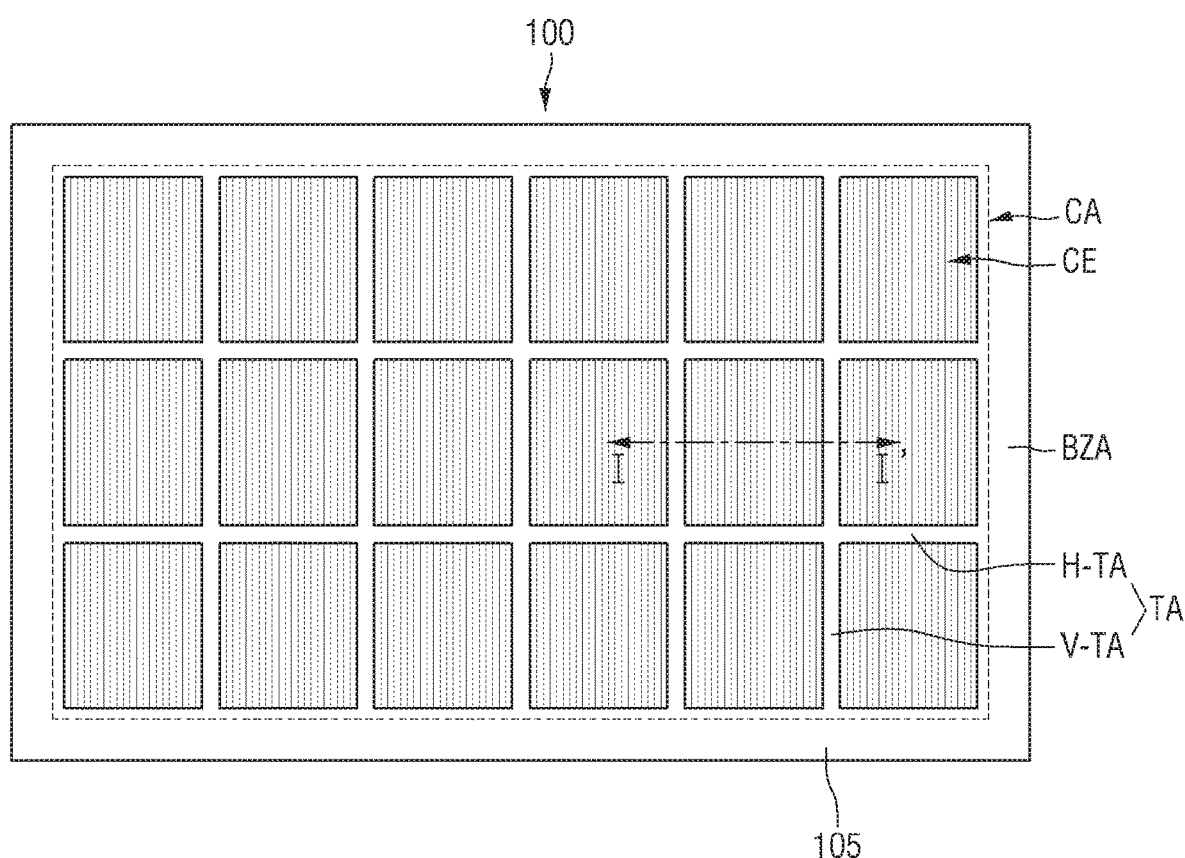
FIG. 1 is a plan view of a master substrate constructed according to the principles of the invention.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Figure 2:
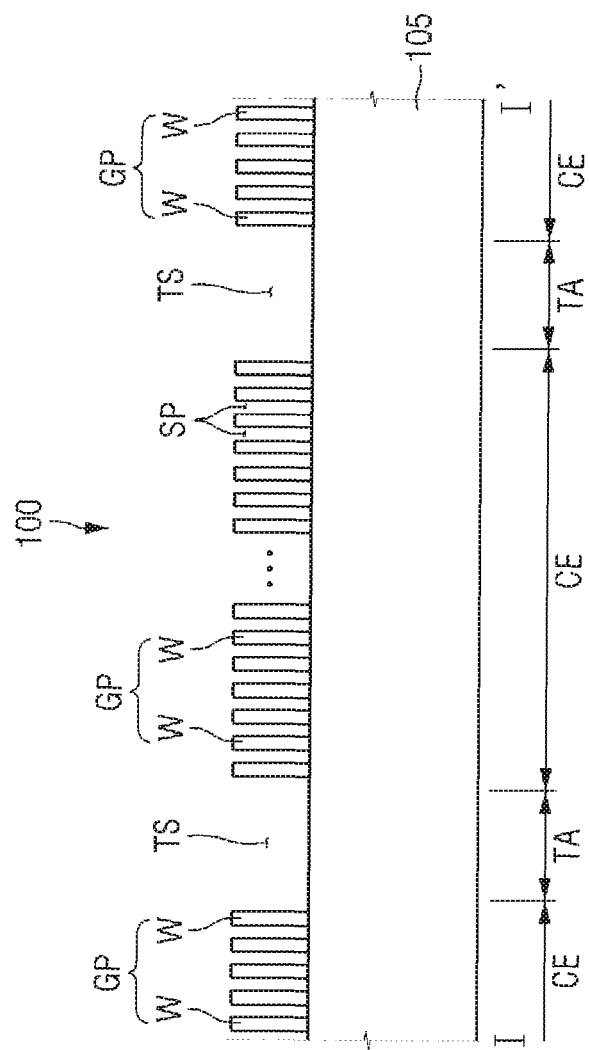
FIG. 2 is a cross-sectional view taken along line I-I' of FIG. 1 showing a first embodiment of master substrate constructed according to the principles of the invention in which trenches between the cell areas are formed as recessed spaces.
Figure 3:
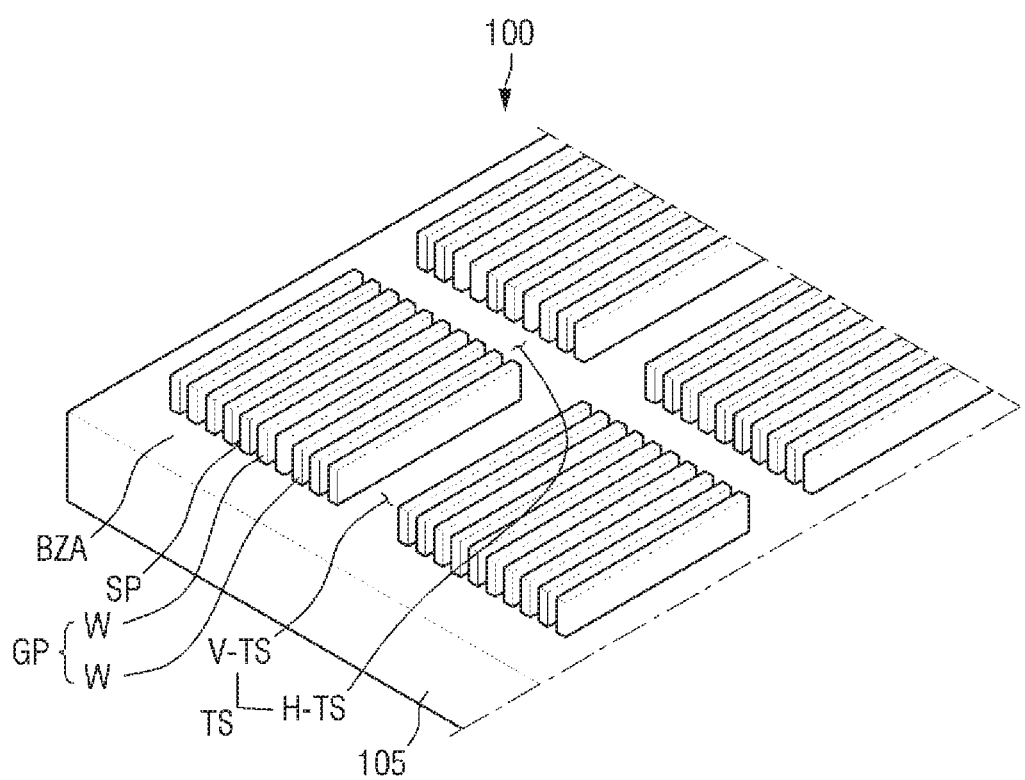
FIG. 3 is a perspective view of a portion of the master substrate illustrated in FIG. 2.

FIG. 1 is a plan view of a master substrate constructed according to the principles of the invention. FIG. 2 is a cross-sectional view taken along line I-I' of FIG. 1 showing a first embodiment of master substrate constructed according to the principles of the invention in which trenches between the cell areas are formed as recessed spaces. FIG. 3 is a perspective view of a portion of the master substrate illustrated in FIG. 2.

Referring to FIG. 1, a wire grid pattern 100 formed on a substrate 105 may include a cell area CA and a bezel area BZA disposed around the cell area CA in a predetermined pattern. In the cell area CA, a plurality of cells CE and trench areas TA separating each of cells CE from each other may be formed.

The wire grid pattern 100 may be used as a master substrate or as a wire grid polarizer. In the following description, the wire grid pattern 100 used as a master substrate will be described as an example for convenience of illustration.

The substrate 105 may be a transparent substrate and may be made of a material appropriate for the use and processing. For example, the material may include, but is not limited to, a variety of polymers such as glass, quartz, acryl, triacetylcellulose (TAC), cyclic olefin copolymer (COP), cyclic olefin polymer (COC), polycarbonate (PC), polyethylene naphthalate (PET), polyimide (PI), polyethylene naphthalate (PEN), polyether sulfone (PES), polyarylate (PAR), etc. The substrate 105 may be made of a base material for an optical film having a certain degree of flexibility.

The master substrate may have a rectangular shape. The bezel area BZA having a predetermined width may be disposed along the periphery of the master substrate. The cell area CA may be located inside the bezel area BZA.

The bezel area BZA is formed at the periphery of the substrate 105 such that it is spaced apart from the cell area CA which is the active area, e.g., on which light emitting pixels may be formed. This helps handling the master substrate more easily.

A plurality of cells CE is disposed in the cell area CA. Each of the plurality of cells CE includes a wire pattern GP. The wire pattern GP includes a plurality of wires W. The plurality of wires W project upwardly from the substrate 105 and has a plurality of striped patterns with predetermined spacing. In each of the plurality of cells CE, slits SP may be formed that separate the wires W from one another by a predetermined spacing so that the wires W are arranged repeatedly at regular intervals. The line width of the wires W disposed in the cells CE may range from 40 nm to 50 nm, for example, and the slits SP between the slits SP may range from 40 nm to 50 nm, for example. The sum of the line width of the wires W and the slits SP between the slits SP, i.e., a pitch may range from 80 nm to 100 nm. The width of the wires W may be, but is not limited to, equal to the width of the slits SP. As described above, the plurality of cells CE each including the wires W and the slits SP may be disposed on the cell area CA.

In addition, in the cell area CA, the trench area TA may be formed between the cells CE. The trench area TA may separate a cell CE from adjacent cell CE.

For example, where the cells CE are disposed in a matrix, the trench area TA may include horizontal trenches extended in the horizontal direction (H-TA) and vertical trenches extended in the vertical direction (V-TA). Although the wire pattern GP disposed in each of the cells CE is in parallel with the vertical trenches V-TA in this exemplary embodiment, other arrangements are possible. For example, the wire pattern GP may be in parallel with the horizontal trenches H-TA. A plurality of vertical trenches V-TA and a plurality of horizontal trenches H-TA may be disposed in the cell area CA.

As described above, the wire grid pattern may include the cells CE each of which may include the wire pattern GP, and the trench area TA formed between the cells CE.

The master substrate may be used to form the wire grid pattern by an imprint process or the like. A resin is applied onto a substrate, and the resin is pressed by the master substrate, such that a resin pattern can be formed on the substrate. That is, the master substrate including the wire pattern GP may transfer the wire grid pattern.

If the size of the master substrate used to carry out an imprint process is small, the process of imprinting a first area of a resin and pressing an adjacent second area are repeatedly carried out, such that the wire grid pattern can be transferred repeatedly.

In this process, the resin in the first area and in the second area are pressed stepwise by the master substrate, resin may be pushed aside toward the edge of the master substrate, which creates a problem. In particular, the resin is pushed aside such that excessive resin may be formed at the boundary between the first area and the second area. The excessive resin may result in a defective pattern being formed.

The trench area TA may accommodate the excessive resin. As the trench area TA accommodates the excessive resin, it is possible to suppress defective patterns created at the boundaries. In other words, the trench area TA serves to prevent a defective pattern by accommodating the excessive resin possibly created at the boundaries when the imprinting process is carried out with the master substrate.

Such an exemplary defective pattern created due to the excessive resin at the boundaries will be described in detail below with respect to a method for fabricating the wire grid pattern.

As noted above, the wire grid pattern 100 formed on the substrate may be used as the master substrate or as the wire grid polarizer as well.

Referring back to FIG. 1, the wire grid pattern 100 as the wire grid polarizer will be described. If the grid spacing of the wire patterns GP is shorter than the wavelength of an incident electromagnetic wave, the wire grid polarizer may reflect a polarization component parallel with the wire patterns GP (s-wave) and may transmit a polarization component perpendicular to the wire patterns GP (p-wave).

By making use of this phenomenon, it is possible to fabricate a planar polarizer with good polarization efficiency, high transmittance and wide viewing angle. Unlike the linear polarizer, the wire grid polarizer uses the wire patterns GP as metal and thus has very high reflection efficiency. Accordingly, it can reflect the reflected light again and accordingly reuse the light to form all the light as a single polarized light.

In addition, the wire patterns GP may be arranged in parallel with regular intervals. The polarization extinction ratio may increase as the intervals of the wire patterns GP are shorter than the wavelength of the incident light. However, the shorter the intervals are, the more difficult it is to fabricate the pattern. Visible light typically has wavelengths in the reflective area RA of 380 nm to 780 nm. In order to achieve a high extinction ratio for three primary colors of light, red, green and blue (R, G and B), the wire grid polarizer has to have an interval of 200 nm or less to expect polarization properties. In order to achieve polarization performance at least equivalent to that of existing polarizers, the wire grid polarizer may have, but is not limited to, the intervals of 80 nm to 100 nm or less.

To be specific, the display device may include an active area where images are displayed, and an inactive area where image signals and the like are transmitted to the active area. In the active area, pixel areas which are transmissive areas as aperture areas, and non-transmissive areas as non-aperture areas may be formed. In the non-transmissive areas, a black matrix separating pixels in the pixel areas and the like are disposed. In the non-transmissive areas, a black matrix, a variety of lines supplying pixel voltage to pixels and the like may be disposed.

When the wire grid polarizer is aligned with the display device, the cells CE may be disposed in the area corresponding to the aperture area of the display device, and the trench area TA may be disposed in the area corresponding to the non-aperture area of the display device.

In other words, the cell area CA and the active area may be defined as the same area. In the cell area CA, the cells CE may be disposed in the transmissive areas. The trench area TA may be in the non-transmissive area of the active area where the black matrix and the like are disposed.

For example, the cells CE disposed in the cell area CA may be disposed in the transmissive area where the pixel electrodes in the active area are disposed. The trench area TA may be disposed in the non-transmissive areas where gate lines, data lines, capacitor lines, thin-film transistors and the black matrix are disposed in the active area.

As described above, the wire grid polarizer 100 having cells CE including the wire patterns GP and the trench area TA according to one or more exemplary embodiments will be described in detail below.

One exemplary embodiment will be described in detail below with reference to FIGS. 2 and 3. In the cell area CA of the wire grid pattern 100, the plurality of cells CE may be disposed, and the trench area TA may be disposed between the cells CE.

In the trench area TA, a sink pattern TS may be disposed that is recessed from the top surface of the wire pattern GP completely toward the top surface of the substrate 105. In other words, the sink pattern TS may be formed in a negative pattern (open space) similarly to the slits SP and may have a width larger than the width of the slits SP.

When the wire patterns GP are arranged in a direction for polarization, the negative sink pattern TS may consist of a vertical sink pattern V-TS in parallel with the wire patterns GP and a horizontal sink pattern H-TS.

For example, when the wire patterns GP are arranged in parallel with the vertical sink pattern V-TS, the wire patterns GP and the slits SP may be arranged in parallel with the vertical sink pattern V-TS, and the horizontal sink pattern H-TS may be arranged in the direction perpendicular to the wire patterns GP and the slits SP.

The end of the horizontal sink pattern H-TS or the vertical sink pattern V-TS may be connected to the bezel area BZA. Similarly to the sink pattern TS, the bezel area BZA may also be disposed in a negative pattern. The horizontal sink pattern H-TS may, but is not required to, be connected to the end of the slits SP in the longitudinal direction (i.e., a direction parallel to the vertical sink pattern V-TS). For example, where the wire patterns GP are arranged in parallel with the horizontal sink pattern H-TS, the ends of the slits SP may be connected to the vertical sink pattern V-TS. The sink pattern TS is not limited to the above-described vertical sink pattern V-TS or the horizontal sink pattern H-TS but may be arranged in a variety of patterns.

In this manner, when the wire grid pattern 100 according to one or more exemplary embodiments is used as the wire grid polarizer, the sink pattern TS is disposed in accordance with the non-aperture area, such that a reflective pattern may be formed in the non-aperture area. For example, the sink pattern TS may be the reflective pattern.

Accordingly, the wire grid pattern 100 according to this exemplary embodiment can increase the reflection efficiency in the non-transmissive area by the sink pattern TS and the transmittance and polarization property of the transmissive area can be improved.

Figure 4:
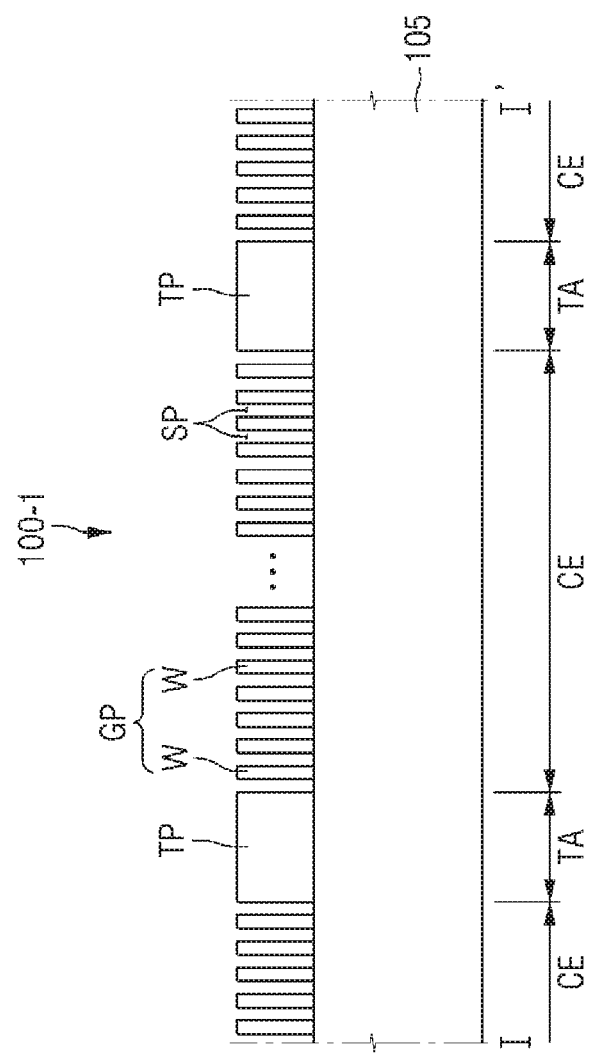
FIG. 4 is a cross-sectional view taken along line I-I' of FIG. 1 showing a second embodiment of master substrate constructed according to the principles of the invention in which trenches between the cell areas are formed as raised protrusions.
Figure 5:
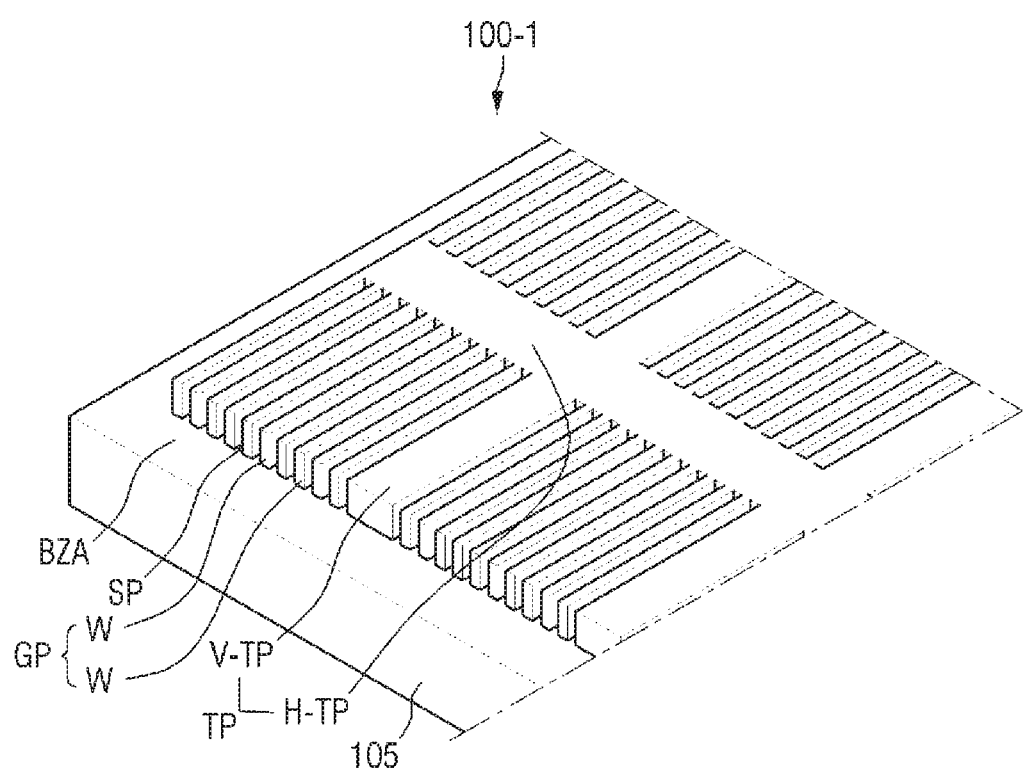
FIG. 5 is a perspective view of a portion of the master substrate illustrated in FIG. 4.

FIG. 4 is a cross-sectional view taken along line I-I' of FIG. 1 showing a second embodiment of master substrate constructed according to the principles of the invention in which trenches between the cell areas are formed as raised protrusions. FIG. 5 is a perspective view of a portion of the master substrate illustrated in FIG. 4. In describing one or more exemplary embodiments according to FIGS. 4-4, FIGS. 1 to 3 will be referenced to avoid the redundancy and for ease of description.

Referring to FIGS. 4 and 5, the master substrate according to one or more exemplary embodiments includes a wire grid pattern 100-1 formed on a substrate 105. The wire grid pattern 100-1 is divided into a cell area CA and a bezel area BZA. In the cell area CA, cells CE and trench areas TA may be formed.

Each of the cells CE includes a wire pattern GP. The wire pattern GP includes a plurality of wires W. The plurality of wires W project upwardly from the top surface of the substrate 105 and has a plurality of stripe patterns with a predetermined spacing.

In each of the cells CE, slits SP may be formed that separate the wires W from one another by a predetermined spacing so that the wires W are arranged repeatedly at regular intervals.

The trench area TA is disposed between the cells CE to separate a cell CE from other cells CE and may have a protruding pattern TP. The protruding pattern TP also may project upwardly from the top surface of the substrate 105. In other words, the protruding pattern TP may be a positive pattern similarly to the wire patterns GP.

The protruding pattern TP may be connected to and in contact with at least one end of each of the wires W in the longitudinal direction. Specifically, as shown in the drawings, when the wire patterns GP extend in the vertical direction, the protruding pattern TP may include a vertical protruding pattern V-TP in parallel with the wire patterns GP, and a horizontal protruding pattern H-TP intersecting the vertical protruding pattern V-TP and the longitudinal direction (i.e., a direction parallel to the vertical protruding pattern V-TP) of the wire patterns GP. Although the horizontal protruding pattern H-TP and the vertical protruding pattern V-TP are orthogonal to each other in this exemplary embodiment, other arrangements are possible.

At least one end of the wire pattern GP in its longitudinal direction may be connected to one side or both sides of the horizontal protruding pattern H-TP along the direction in which it is extended. In addition, the wire pattern GP adjacent to the vertical protruding pattern V-TP may be spaced apart from it by a predetermined gap with a slit position SP therebetween.

As described above, the master substrate 100-1 may include the wire patterns GP and the positive protruding pattern TP having a similar height with that of the wire patterns GP.

Accordingly, in the wire grid pattern 100-1 according to one or more exemplary embodiments, the trench area TA separating between the cells CE including the wire patterns GP formed in the protruding pattern TP, such that a reflective pattern may be disposed in the non-transmissive area, and transmittance and polarization property can be improved in the transmissive area. For example, the protruding pattern TP may be the reflective pattern.

Figure 6:
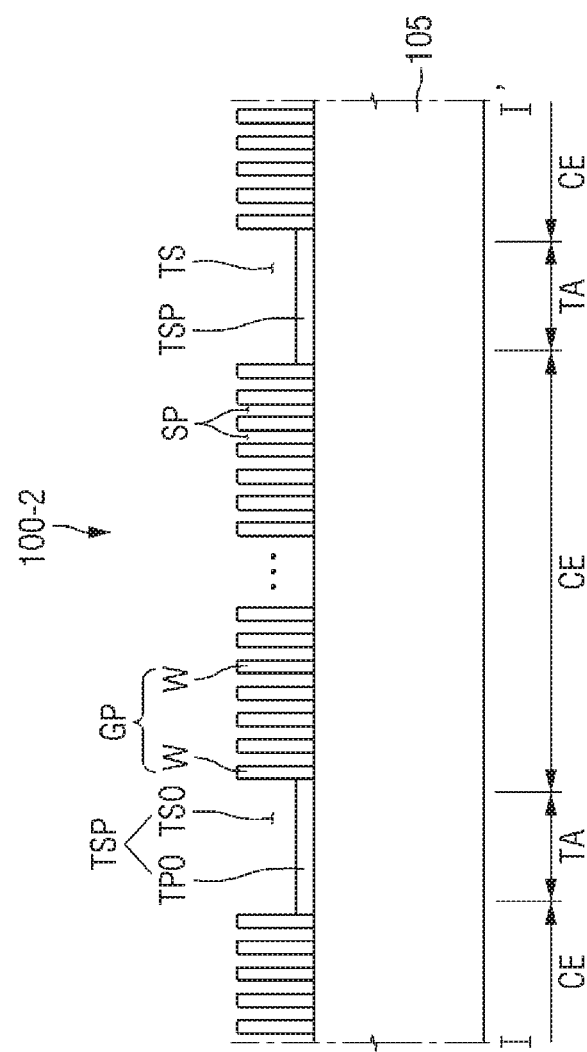
FIG. 6 is a cross-sectional view taken along line I-I' of FIG. 1 showing a third embodiment of master substrate constructed according to the principles of the invention in which trenches between the cell areas are formed as partially raised protrusion in recesses.
Figure 7:
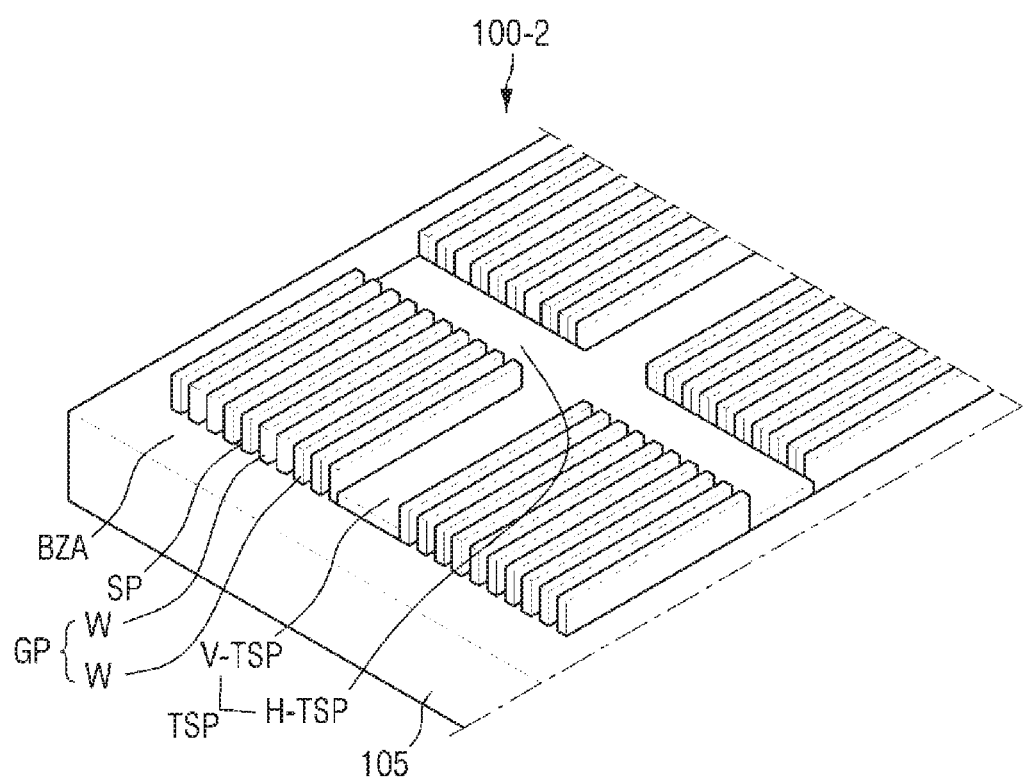
FIG. 7 is a perspective view of a portion of the master substrate illustrated in FIG. 6.

FIG. 6 is a cross-sectional view taken along line I-I' of FIG. 1 showing a third embodiment of master substrate constructed according to the principles of the invention in which trenches between the cell areas are formed as partially raised protrusion in recesses. FIG. 7 is a perspective view of a portion of the master substrate illustrated in FIG. 6. In describing the exemplary embodiment of FIGS. 6-7, FIGS. 1 to 3 will be referenced to avoid redundancy and for ease of description.

Referring to FIGS. 6 and 7, the master substrate according to one or more exemplary embodiments includes a wire grid pattern 100-2 on a substrate 105. The wire grid pattern 100-2 is divided into a cell area CA and a bezel area BZA. In the cell area CA, cells CE and a trench area TA may be formed.

Each of the cells CE includes a wire pattern GP. The wire pattern GP includes a plurality of wires W. The plurality of wires W protrudes from the substrate 105 and has a plurality of stripe patterns with a predetermined spacing.

In each of the cells CE, slits SP may be formed that separate the wires W from one another by a predetermined spacing so that the wires W are arranged repeatedly at regular intervals.

The trench area TA is disposed between the cells CE to separate a cell CE from other cells CE.

According to one or more exemplary embodiments, the trench area TA may formed by a sink-protruding pattern TSP including a protruding portion TP0 projecting upwardly from the top surface of the substrate 105 and a sink portion TS0 recessed from the top surface of the wire pattern GP toward the top surface of the protruding pattern TSP.

For example, the sink-protruding pattern TSP may include the protruding portion TP0 formed in the sink portion TS0, and the thickness of the protruding portion TP0 may be less than that of the wire patterns GP.

Accordingly, the protruding portion TP0 of the sink-protruding pattern TSP may be positive with respect to the surface of the substrate 105, whereas the sink portion TS0 of the sink-protruding pattern TSP may be negative with respect to the top surface of the wire pattern GP. Accordingly, the sink-protruding pattern TSP may adjust the area of the sink portion TS0 according to the thickness of the protruding portion TP0 and thus may adjust the size of the space in which the excessive resin is accommodated.

The sink-protruding pattern TSP formed between the cells CE may be connected to the side surfaces of the wire patterns GP close to the trench area TA. In addition, the sink-protruding pattern TSP may be connected to at least one end of each of the wire patterns GP in the longitudinal direction. The sink-protruding pattern TSP may be connected to the side surface or the at least one end of the wires pattern GP by the protruding portion TP0. In addition, the side surfaces of the wire patterns GP between the cells CE, i.e., close to the trench area TA may be spaced apart from each other by the sink portion TS0 of the sink-protruding pattern TSP.

Specifically, the sink-protruding pattern TSP may include a vertical sink-protruding pattern V-TSP disposed in parallel with the longitudinal direction of the wire patterns GP, and a horizontal sink-protruding pattern H-TSP intersecting the vertical sink-protruding pattern V-TSP.

In addition, the side surfaces of the wire patterns GP close to the trench area TA may come in contact with the protruding portion TP0 of the vertical sink-protruding pattern V-TSP. In addition, at least one end of the wire patterns GP may come in contact with the protruding portion TP0 of the horizontal sink-protruding pattern H-TSP.

In the above-described manner, by performing an imprint process with the wire grid pattern 100-2 including the wire patterns GP, the slits SP and the sink-protruding pattern TSP, a large master substrate or wire grid polarizer can be formed.

The sink portion TS0 of the sink-protruding pattern TSP may provide a space which is the same as or different from the slits SP during an imprint process. In this regard, the imprint process will be described briefly. The imprint process may include bring the wire grid pattern 100-2 into contact with the surface of the resin such that the residual resin material may be carried out in a negative pattern like the slits SP. According to this exemplary embodiment, the wire grid pattern 100-2 includes the sink-protruding pattern TSP in a negative pattern as well as the slits SP in a negative pattern, so that the residual resin material can be carried out even through the trench area TA.

Then, the resin is cured, such that a material to be etched under the resin, e.g., a metal layer may be etched. For example, the material to be etched which is exposed by the cured resin pattern may be etched. The residual resin material may be carried out by the force of osmosis or capillarity such that the space of the slits SP may be filled with the resin. However, the imprint process is not limited to the above-described manner. For example, the imprint process may include pressing the wire grid pattern 100-2 to fill the slits SP with the resin.

During the imprint process using the wire grid pattern 100-2, the space of the slits SP is fully filled with the resin whereas the trench area TA may not be fully filled with the resin when the mass transition is carried out, because the space of the trench area TA is larger than the space of the slits SP. In the following description, the resin filling the slits SP is referred to as a filling resin, while the resin not fully filling trench area TA is referred to as a non-filling resin.

If the non-filling resin is created in the space of the trench area TA, a part of the non-filling resin may not be cured during an exposure process, resulting in an exposure failure. In other words, in the space of the slits SP, light may pass through the wire grid pattern 100-2 and then the filling resin in contact with the wire grid pattern 100-2.

On the other hand, in the trench area TA, the light may pass through the wire grid pattern 100-2, the air or vacuum in the space of the trench area TA, and then the non-filling resin formed in the trench area TA. As such, the path of the light may differ depending on the amount of the resins in the spaces.

Accordingly, as the trench area TA is not fully filled with the resin, the path of light is changed, such that a non-cured resin may be created. In a subsequent process of etching a material under the resin, an etching failure may occur due to the non-cured resin pattern.

In order to reduce the area where the resin pattern is not cured due to the non-filling resin, the sink-protruding pattern TSP is disposed in the trench area TA to adjust the filling space.

Accordingly, in the wire grid pattern 100-2 according to this exemplary embodiment, the trench area TA separating between the cells CE including the wire patterns GP is formed by the sink-protruding pattern TSP, such that the amount of excessive resin is adjusted, thereby suppressing non-cured resin pattern.

Accordingly, when a wire grid polarizer fabricated by using the wire grid pattern 100-2 is applied to a display device, a defective reflective pattern disposed in the trench area TA is prevented by using the sink-protruding pattern TSP of the trench area TA. As a result, reflection efficiency of the non-transmissive area can be increased by disposing the reflective pattern, while the transmittance for polarization property of the transmissive area can be improved. For example, the sink-protruding pattern TSP may be the reflective pattern.

Further, the wire grid pattern 100-2 cab reduce a defective pattern possibly occurring during a process of fabricating a large wire grid polarizer or a larger than master substrate.

Figure 8:
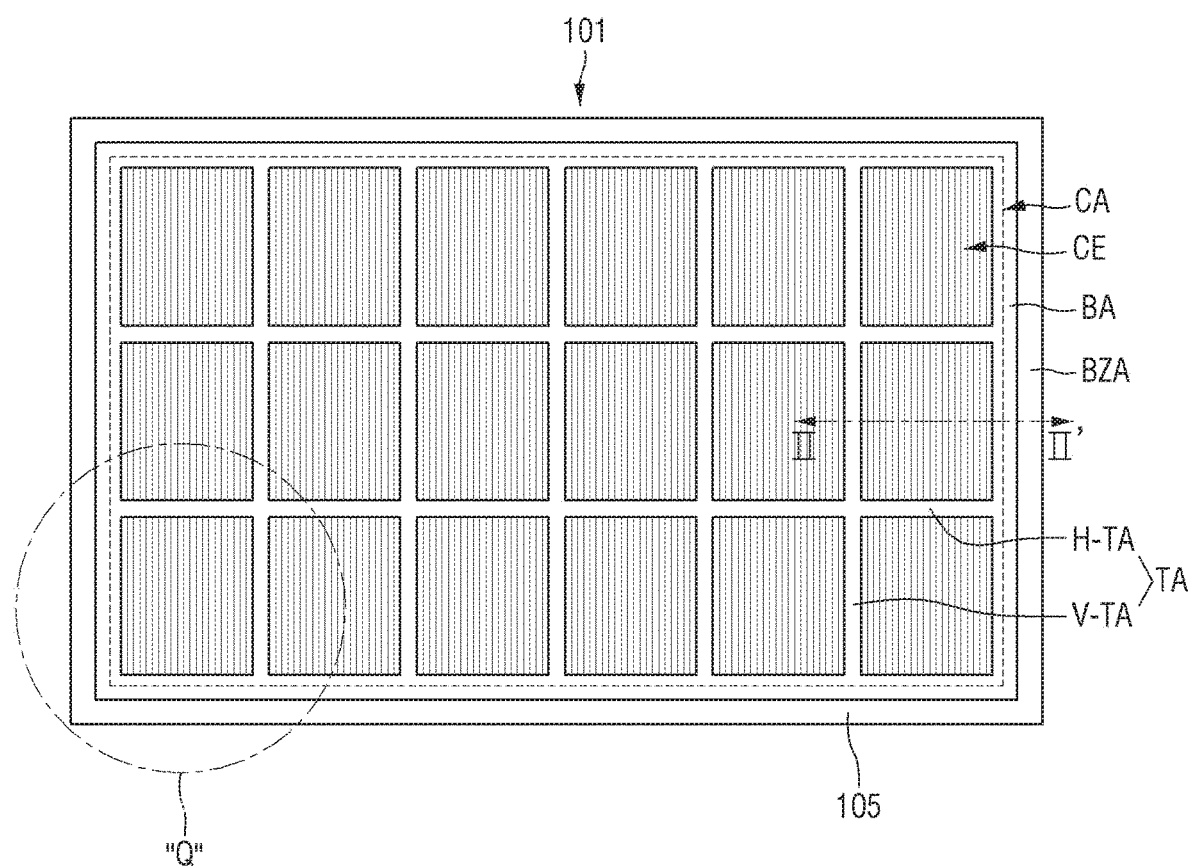
FIG. 8 is a plan view of another master substrate constructed according to the principles of the invention.
Figure 9:
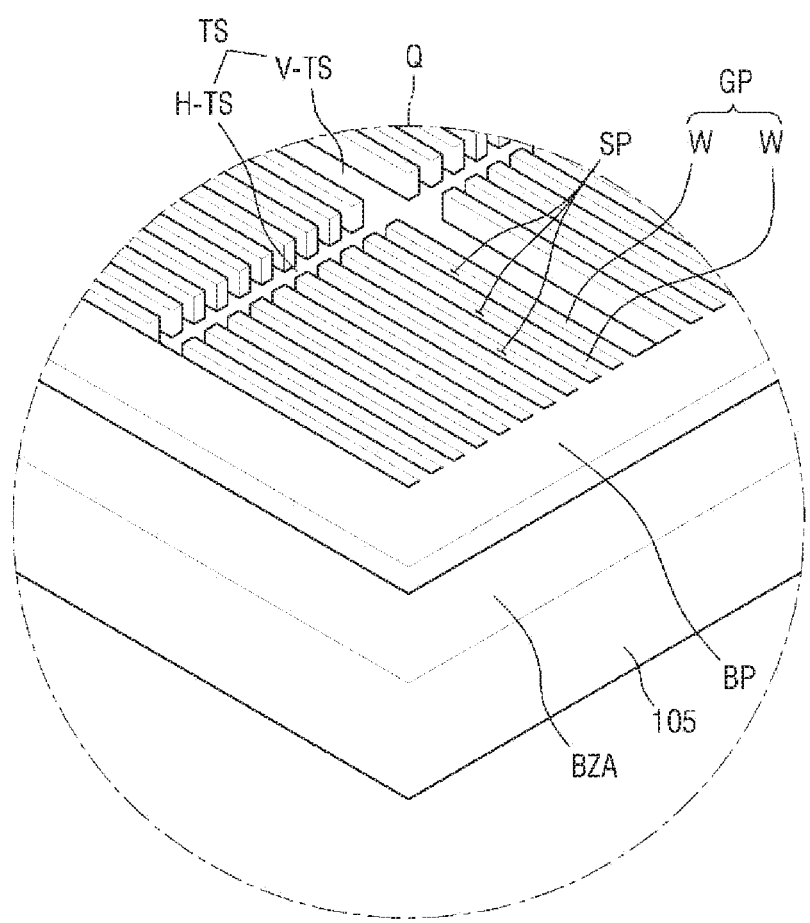
FIG. 9 is perspective view of area Q of FIG. 8 showing wire grid patterns having variable heights.
Figure 10:
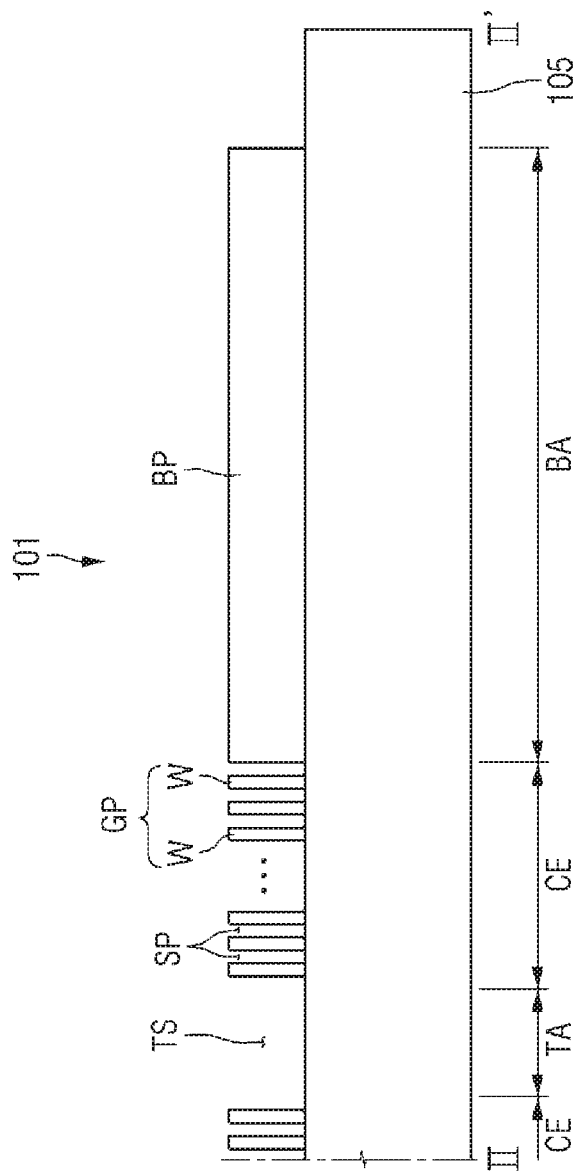
FIG. 10 is a cross-sectional view taken along line II-II' of FIG. 8 showing an embodiment of a bank portion adjacent the bezel area.

FIG. 8 is a plan view of another master substrate constructed according to the principles of the invention. FIG. 9 is perspective view of area Q of FIG. 8 showing wire grip patterns having variable heights. FIG. 10 is a cross-sectional view taken along line II-II' of FIG. 8 showing an embodiment of a bank portion adjacent the bezel area. In describing the exemplary embodiment of FIGS. 8-10, FIGS. 1 to 3 will be referenced to avoid redundancy and for ease of description.

Referring to FIGS. 8 to 10, the master substrate according to one or more exemplary embodiments includes a wire grid pattern 101 on a substrate 105. The wire grid pattern 101 may include a cell area CA and a bezel area BZA disposed around the cell area CA, which are arbitrarily divided. For example, the substrate 105 may have a rectangular shape. The bezel area BZA having a predetermined width may be disposed along the periphery of the substrate 105. The cell area CA may be located inside the bezel area BZA.

The plurality of cells CE may be disposed in the cell area CA. Each of the cells CE may include a wire pattern GP. The wire pattern GP includes a plurality of wires W. In each of the plurality of cells CE, slits SP separating a wire W from an adjacent wire W may be disposed. In addition, in the cell area CA, the trench area TA may be formed that separates a cell CE from other cells CE.

The trench area TA may include a vertical trench V-TA in parallel with the wire patterns GP and a horizontal trench H-TA intersecting the vertical trench V-TA. A plurality of vertical trenches V-TA and a plurality of horizontal trenches H-TA may be disposed in the cell area CA.

In this exemplary embodiment, it is assumed that the trench area TA is formed in a sink pattern TS. The master substrate 101 according to this exemplary embodiment may further include a bank area BA on at least a part of the area between the cell area CA and the bezel area BZA.

The bank area BA may be disposed such that it is connected to and comes in contact with the ends of the wire patterns GP in the longitudinal direction (i.e., a direction parallel to the vertical trench V-TA) and may have a width larger than that of the trench area TA. In the bank area BA, a positive bank pattern BP protruding from the surface of the substrate 105 may be disposed. Although the positive bank pattern BP is disposed in the bank area BA in this exemplary embodiment, other arrangements are possible. For example, in other exemplary embodiments, a negative bank pattern may be formed in the bank area BA.

Referring to FIGS. 9 and 10, in the trench area TA formed in the wire grid pattern 101 according to the exemplary embodiment, a sink pattern TS may be disposed that is recessed from the top surface of the wire patterns GP toward the surface of the substrate 105.

In the plurality of cells CE disposed in a matrix in the cell area CA, a plurality of wire patterns GP may be disposed. The plurality of wire patterns GP may project upwardly from the top surface of the substrate 105. In addition, each of cells CE includes a plurality of wires W and slits SP that separate between the wires W by a predetermined spacing.

Some of the cells CE disposed at the periphery of the cell area CA may be connected to and come in contact with the bank pattern BP. In other words, the ends of the wire patterns GP in the longitudinal direction that are adjacent to the bank pattern BP may come in contact with the positive pattern connected to the bank pattern BP. In addition, the other ends of the wire patterns GP in the longitudinal direction that are adjacent to the bank pattern BP may come in contact with the sink pattern TS of the trench area TA.

In addition, the wire patterns GP adjacent to the bank pattern BP may be spaced apart from the bank pattern BP by the slits SP. Specifically, the side surfaces of the wire patterns GP in the longitudinal direction may be spaced apart from the side surface of the bank pattern BP by the slits SP.

As described above, the wire grid polarizer using the wire grid pattern 101 according to this exemplary embodiment includes the cells CE, the trench area TA in the sink pattern TS, and the bank pattern BP between the cell area CA and the bezel area BZA. As a result, the reflection efficiency can be increased and the transmittance and the polarization property can be improved.

The wire grid pattern 101 according to this exemplary embodiment also may be used as the master substrate. By using the wire grid pattern 101, it is possible to form a large master substrate or to form a large wire grid polarizer.

For convenience of illustration, an example of forming the master substrate using the wire grid pattern 101 will be described below.

When an imprint process is carried out by using the wire grid pattern 101 to form a large master substrate, the bank pattern BP disposed in the bank area BA may prevent excessive resin created at the edge of the wire grid pattern 101, thereby preventing a defective pattern formed at the edge of the wire grid pattern 101.

For example, the amount of applied resin may be adjusted by adjusting the thickness. If the amount of the applied resin is insufficient, the cells CE are not fully filled with the resin, such that a defective pattern is more likely to be formed in the cell area CA. If the amount of the applied resin is sufficient, the cells CE are filled with the resin, such that a defective pattern is less likely to be formed in the cell area CA. However, this may result in excessive resin.

For example, it is possible to prevent movement of the residual resin material to an edge of the wire grid pattern 101, e.g., the bezel area BZA by the bank pattern BP. The residual resin material may be carried out toward the negative pattern of the wire grid pattern 101. Specifically, as the wire grid pattern 101 includes the bank pattern BP in a positive pattern, the residual resin material may be carried out toward the sink pattern TS of the trench area TA or the slits SP in the negative pattern in the cell area CA.

If there is no bank area BA in the wire grid pattern 101, movement of the residual resin material may take place toward the bezel area BZA of the wire grid pattern 101, since the edge of the wire grid pattern 101, e.g., the bezel area BZA is the negative pattern with respect to the top surface of the wire patterns GP. That is, the resin may flow to the bezel area BZA, i.e., excessive resin may be created. Such excessive resin may result in a defective resin pattern later on. If the defective resin pattern is used as a mask for etching a metal layer thereunder, a defective metal pattern may be formed. If the defective metal pattern is used as the wire grid polarizer, transmittance and polarization property can be degraded. If the defective metal pattern is used as the master substrate, a defective pattern may be transferred.

In contrast, according to the exemplary embodiment, the bank area BA is disposed at at least a part of the area between the bezel area BZA and the cell area CA, it is possible to prevent movement of the residual resin material toward the bezel area BZA. Accordingly, it is possible to prevent a defective pattern resulted from the excessive resin.

Incidentally, by performing imprint processes repeatedly with the wire grid pattern 101 according to the exemplary embodiment, a large wire grid polarizer or a large master substrate can be fabricated. When the imprint processes are performed repeatedly with the wire grid pattern 101, the width of the bank pattern BP may be substantially equal to or larger than the width of the trench area TA.

Specifically, when the imprint processes are performed by using the wire grid pattern 101 as the master substrate, the width of the bank pattern BP may have a width similar to the width of the trench area TA so that it may perform the function of the trench area TA. For example, the bank area BA used in the wire grid pattern 101 may work as the trench area TA, by way of repeatedly patterning the bank area BA using the wire grid pattern 101 as the master substrate so that the bank area BA are overlapped.

Accordingly, when a large master substrate is formed by using the wire grid pattern 101 according to one or more exemplary embodiments, the bank pattern BP disposed at the edge of the large master substrate may form the bank area BA, and the bank pattern BP inside the large master substrate, i.e., the cell area CA may form the trench area TA.

Accordingly, it is possible to prevent a defective pattern due to excessive resin during the process of fabricating a large master substrate by using the wire grid pattern 101 according to one or more exemplary embodiments.

Figure 11:
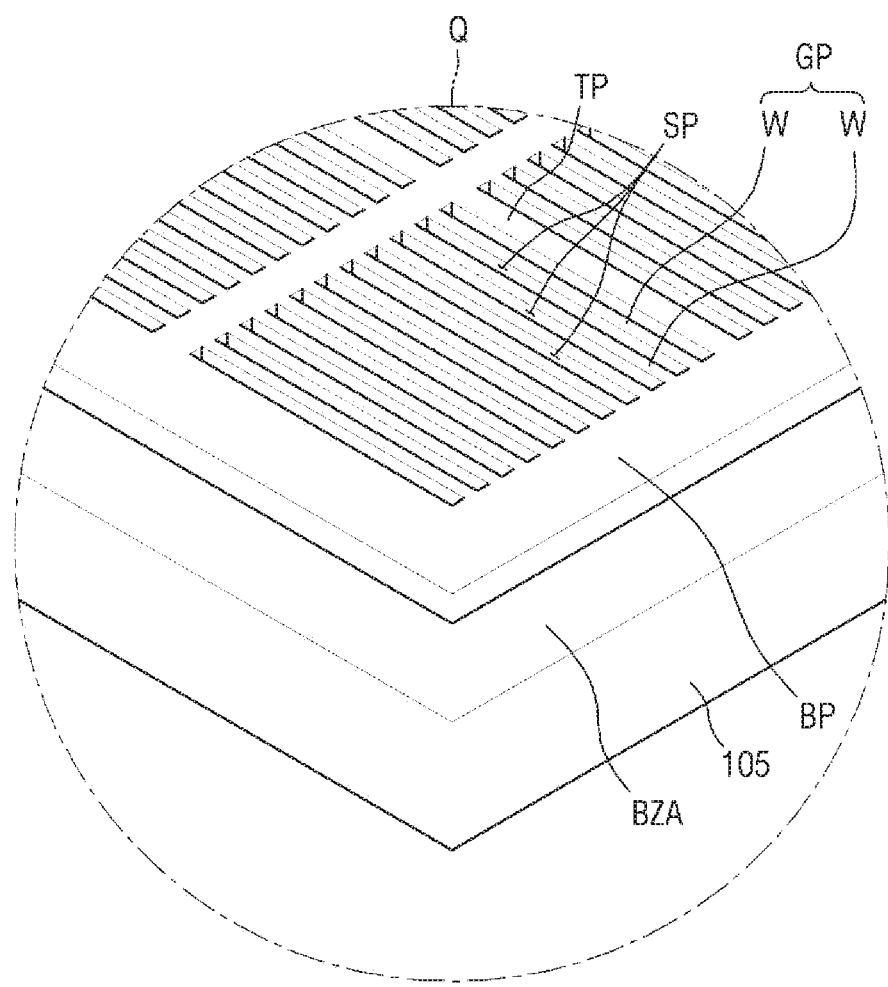
FIG. 11 is a perspective view of area Q of FIG. 8 showing protruding patterns as trench areas according to another exemplary embodiment.
Figure 12:
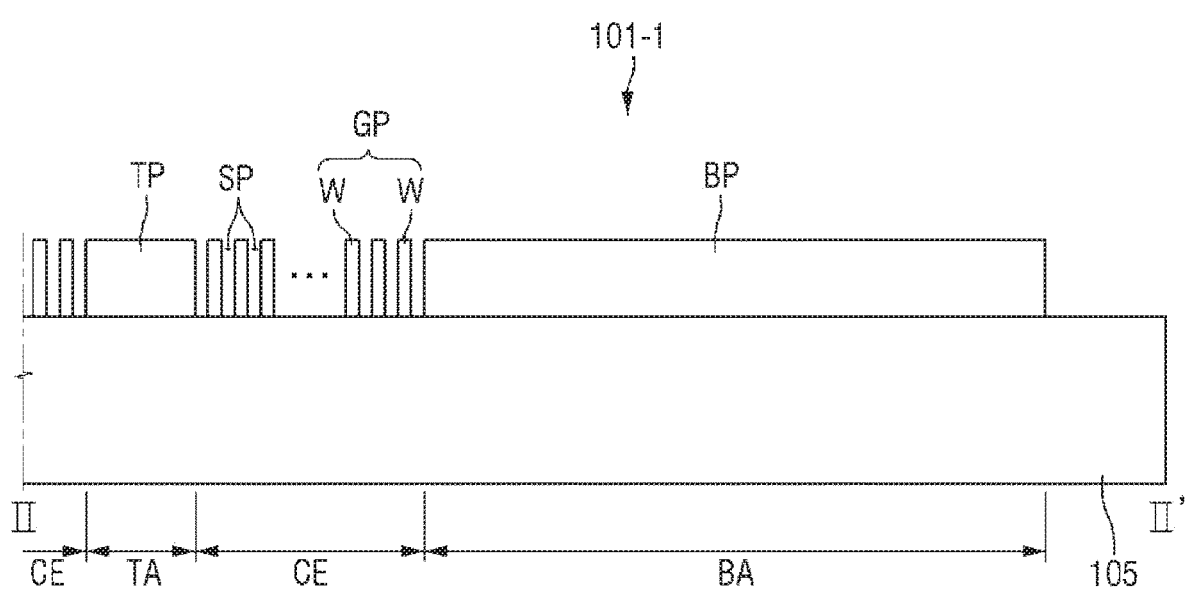
FIG. 12 is a cross-sectional view taken along line II-II' of FIG. 8 showing another embodiment of a bank portion adjacent the bezel area.
Figure 13:
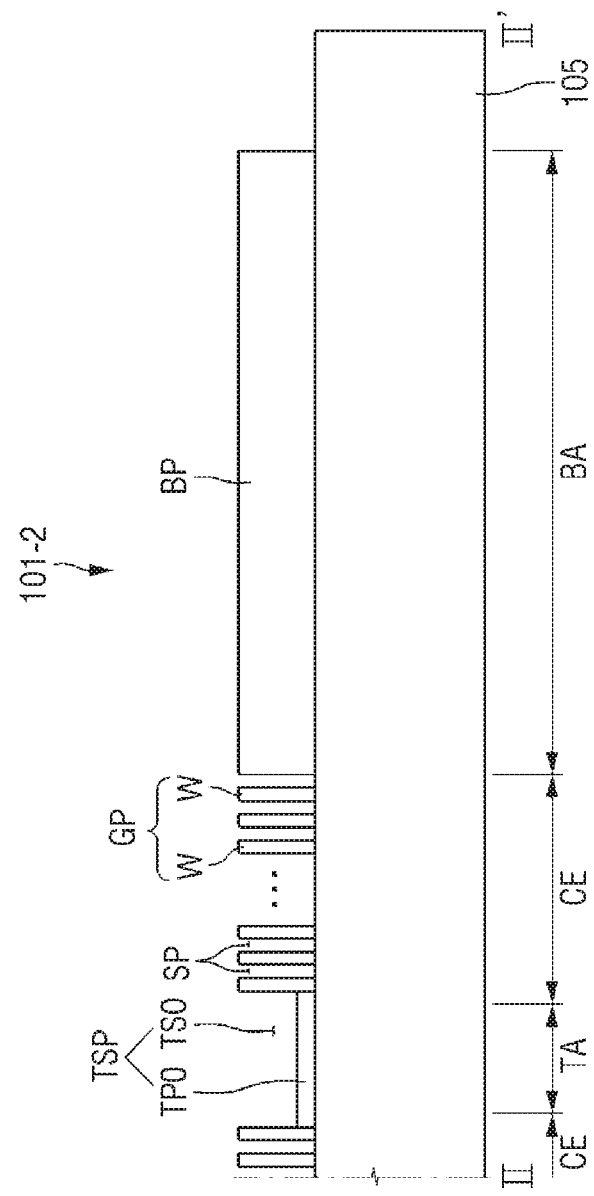
FIG. 13 is a cross-sectional view taken along line II-II' of FIG. 8 showing trenches between the cell areas formed as partially raised protrusion in recesses according to another exemplary embodiment.

FIG. 11 is a perspective view of area Q of FIG. 8 showing protruding patterns as trench areas according to another exemplary embodiment. FIG. 12 is a cross-sectional view taken along line II-II' of FIG. 8 showing another embodiment of a bank portion adjacent the bezel area. FIG. 13 is a cross-sectional view taken along line II-II' of FIG. 8 showing trenches between the cell areas formed as partially raised protrusion in recesses according to another exemplary embodiment.

In describing the exemplary embodiments of FIGS. 11-13, FIGS. 8 to 10 will be referenced to avoid redundancy and for ease of description.

Referring to FIGS. 11 and 12, the wire grid pattern 101-1 according to this exemplary embodiment may be used as a wire grid polarizer or as a master substrate.

Initially, an example where the wire grid pattern 101-1 according to the exemplary embodiment is used as a wire grid polarizer will be described. In the trench area TA formed in the wire grid pattern 101-1, a protruding pattern TP which is a positive pattern like the wire patterns GP may be disposed.

The protruding pattern TP may be connected to and in contact with ends of the wire patterns GP in the longitudinal direction. One end of the wire pattern GP disposed on the outermost side of the wire patterns GP may be connected to and come in contact with the protruding pattern TP, and the other end thereof may be connected to and come in contact with the bank pattern BP.

In addition, the side surface of the wire pattern GP adjacent to the bank pattern BP may be spaced apart from the bank pattern BP by the slits SP. Specifically, the side surfaces of the wire patterns GP in the longitudinal direction may be spaced apart from the side surface of the bank pattern BP by the slits SP.

Accordingly, when the wire grid pattern 101-1 according to the exemplary embodiment is used as a wire grid polarizer, the reflection efficiency of the wire grid polarizer can be increased while the transmittance and polarization property can be improved.

In addition, when the wire grid pattern 101-1 according to the exemplary embodiment is used as a master substrate, it is possible to perform an imprint process with the wire grid pattern 101-1.

According to this exemplary embodiment, the protruding pattern TP, the wire patterns GP and the bank pattern BP are formed in a positive pattern, and only the slits SP is formed in a negative pattern, via which the residual resin material can be carried out. That is, a resin pattern can be formed only with the slits SP.

Accordingly, when an imprint process for forming a wire grid polarizer by using the wire grid pattern 101-1 according to the exemplary embodiment as the master substrate, only the slits SP is filled with the resin, and thus the amount of the resin can be reduced to thereby save material costs.

As described above, the wire grid pattern 101-1 according to this exemplary embodiment includes the cells CE, the trench area TA including the protruding pattern TP, and the bank pattern BP between the cell area CA and the bezel area BZA, and the wire grid pattern 101-1 is used as the master substrate. As a result, it is possible to prevent a defective pattern due to an excessive resin.

Referring to FIGS. 11 and 13, a wire grid pattern 101-2 according to this exemplary embodiment may be used as a wire grid polarizer or as a master substrate.

Initially, an example where the wire grid pattern 101-2 according to the exemplary embodiment is used as a wire grid polarizer will be described. The trench area TA formed in the wire grid pattern 101-2 may be formed in a sink-protruding pattern TSP including a protruding area TP0 protruding from the surface of the substrate 105, and a sink area TS0 recessed from the top surface of the wire pattern GP toward the surface of the substrate 105.

The sink-protruding pattern TSP may include the protruding portion TP0 formed in the sink portion TS0, and the thickness of the protruding portion TP0 may be smaller than that of the wire patterns GP.

The sink-protruding pattern TSP formed between the cells CE may be connected to the side surfaces of the wire patterns GP close to the trench area TA. In addition, the sink-protruding pattern TSP may be connected to at least one end of each of the wire patterns GP in the longitudinal direction. The sink-protruding pattern TSP may be connected to the side surface or the at least one end of the wires pattern GP by the protruding portion TP0. In addition, side surfaces of the wire patterns GP between the cells CE, i.e., close to the trench area TA may be spaced apart from each other by the sink portion TS0 of the sink-protruding pattern TSP.

In addition, a cell CE disposed on the outermost side of the cell area CA is close to the bank pattern BP, and one end of a wire pattern GP of the cell CE in the longitudinal direction may be connected to and in contact with the protruding portion TP0 of the sink-protruding pattern TSP, and the other end thereof may be connected to and in contact with the bank pattern BP. In addition, the wire pattern GP of the cell on the outermost side may be spaced apart from the bank pattern BP by the slit positions SP.

In other words, the side surfaces formed between the cells CE along the longitudinal direction of the wire patterns GP may be spaced apart from each other by the sink portion TS0 of the sink-protruding pattern TSP. In addition, the side surface of the wire pattern GP disposed on the outermost side may be spaced apart from the side surface of the bank pattern BP by the slits SP. In addition, a side surface and one end of the wire pattern GP disposed on the outermost side of the cell CE among the cells CE in the cell area CA may be in contact with the protruding portion TP0 of the sink-protruding pattern TSP, and the other end thereof may be in contact with the bank pattern BP. At least one end of the protruding portion TP0 of the sink-protruding pattern TSP may be connected to and come in contact with the bank pattern BP.

Accordingly, when the wire grid pattern 101-2 according to the exemplary embodiment is used as a wire grid polarizer, the reflection efficiency of the wire grid polarizer can be increased while the transmittance and polarization property can be improved.

In addition, when the wire grid pattern 101-2 according to this exemplary embodiment is used as a master substrate, it is possible to perform an imprint process with the wire grid pattern 101-1.

The protruding pattern TP0 of the sink-protruding pattern TSP of the wire grid pattern 101-2 according to the exemplary embodiment may be positive with respect to the surface of the substrate 105, whereas the sink portion TS0 of the sink-protruding pattern TSP may be negative with respect to the top surface of the wire pattern GP.

Accordingly, the sink-protruding pattern TSP may adjust the space of the sink pattern TS0 according to the thickness of the protruding pattern TP0 and thus may adjust the space in which the excessive resin is accommodated.

Specifically, in the wire grid pattern 101-2 according to the exemplary embodiment, the sink portion TS0 of the sink-protruding pattern TSP may provide a space which is the same as or different from the slits SP during an imprint process. For example, if the difference between the space of the slits SP and the space of the sink portion is large, the difference between the amounts of the resins filling the spaces may be made due to the difference. Consequently, a defective resin pattern may be formed in the trench area TA. Such defective resin pattern can be reduced by adjusting the space with the sink-protruding pattern TSP.

As described above, the wire grid pattern 101-2 according to this exemplary embodiment includes the wire patterns GP, the trench area TA including the sink-protruding pattern TSP, and the bank pattern BP between the cell area CA and the bezel area BZA, and the wire grid pattern 101-2 is used as the master substrate. As a result, it is possible to prevent a defective pattern due to an excessive resin.

FIGS. 14 to 21 are cross-sectional views of exemplary processing steps of fabricating a wire grid pattern according to the principles of the invention illustrating how excess resin may be removed from moats forming trench areas.

Hereinafter, a method for fabricating the above-described wire grid patterns will be described. The wire grid patterns may be used as a master substrate or may be directly used as a wire grid polarizer. Initially, a method for fabricating a wire grid pattern used as a wire grid polarizer will be described below.

Although the method for fabricating the wire grid pattern 100 will be described with reference to the wire grid pattern 100 shown in FIGS. 1 to 3, other arrangements are possible. The method may be applied to the wire grid patterns 100-1, 100-2, 101, 101-1, 101-2 according to one or more exemplary embodiments described in connection with FIGS. 14-21.

Figure 14:
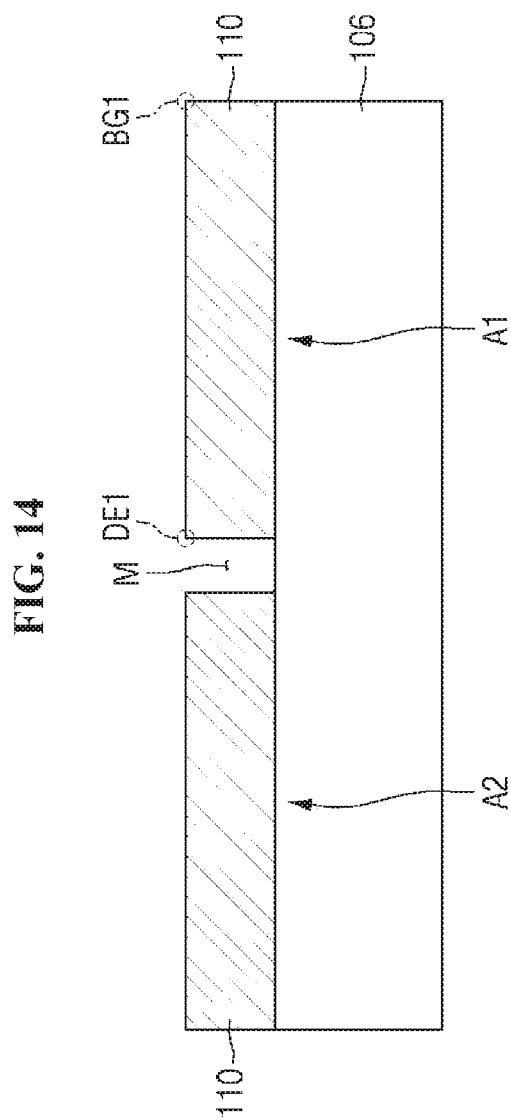
FIGS. 14 to 21 are cross-sectional views of exemplary processing steps of fabricating a wire grid pattern according to the principles of the invention illustrating how excess resin may be removed from moats forming trench areas.
Figure 15:
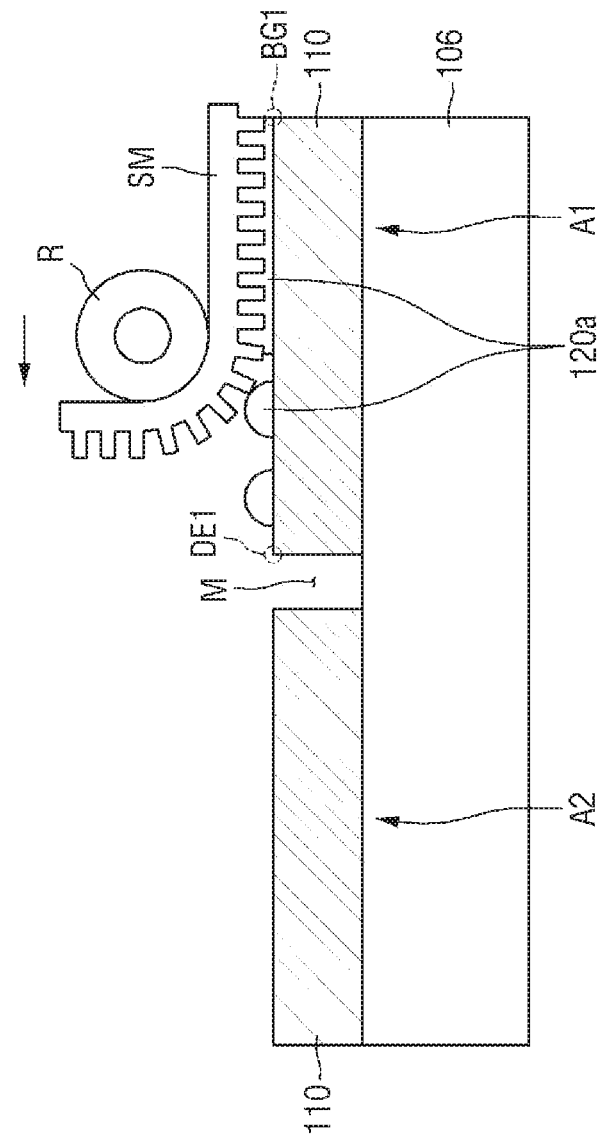

Referring to FIG. 14, a first metal layer 110 is formed on a substrate 106, and a moat M is formed in the first metal layer 110 to divide it into one or more portions, such as A1 and A2 shown in FIG. 15. The substrate 106 may be a large substrate corresponding to a mother substrate of the display panel. The moat M may be formed by forming a photoresist on the first metal layer 110, exposing the photoresist to light using a mask, and etching a part of the first metal layer 110 using the resulting photoresist as a mask. During the process of forming the moat M, a bank area may be formed on at least one side of the periphery of the first substrate 106.

When the wire grid pattern is attached to a display panel later on, the moat M may be in line with the non-aperture area of the display panel. Accordingly, the width of the moat M may be equal to the width of the non-aperture area of the display panel.

In addition, although not shown in the drawings, a bank area BA may be formed at the periphery of the substrate 106 when the moat M is formed. The bank area BA may have a width substantially equal to or larger than the width of the moat M.

The first metal layer 110 formed on the substrate 106 may be made of a metal material. More specifically, the first metal layer 110 may be made of, but is not limited to, one selected from the group consisting of aluminum (Al), chrome (Cr), silver (Ag), copper (Cu), nickel (Ni), titanium (Ti), cobalt (Co) and molybdenum (Mo), or an alloy thereof.

When the wire grid pattern 100 is directly used as a wire grid polarizer, the first metal layer 110 may include two or more layers. For example, the first metal layer (not shown) may be made of aluminum, and the second metal layer (not shown) may be made of titanium or molybdenum.

For example, if the first metal layer is made of aluminum, a hillock may be formed during a subsequent process depending on a processing temperature, such that the upper surface may not be even. As a result, the optical properties of the device may be degraded. To prevent such a hillock, the second metal layer made of titanium or molybdenum is disposed on the first metal layer. In addition, the first metal layer 110 may be made of a metal that is easy to etch during a subsequent passivation process by plasma etching.

The method of forming the first metal layer 110 may include, but is not limited to, typical sputtering, chemical vapor deposition (CVD), evaporation, etc.

Referring to FIG. 15, a first resin 120a may be applied onto a first area A1 of the first metal layer 110 on one side of the moat M. The first resin 120a may be applied preferably by inkjet printing, but other arrangements are possible. For example, the first resin 120a may be applied by spin coating, slit coating, gravure coating, etc.

For example, since the inkjet printing is performed by dropping the first resin 120a onto the first metal layer 110 so that the droplets spread out, the amount of the first resin 120a can be adjusted. Accordingly, it is possible to suppress an excessive resin. Further, the inkjet printing can select an area to which the first resin 120a is applied. In spin coating, for example, the resin is applied throughout the entire surface of the substrate. In contrast, in inkjet printing, the first resin 120a can be applied only on a selected part of the substrate.

When the first resin 120a is dropped onto the surface of the first area A1 of the first metal layer 110, the first resin 120a spreads out over the surface of the first area A1, so that a first resin layer 120 may be formed. Subsequently, a stamp SM is placed on the surface of the first resin layer 120. The stamp SM may be a flexible, soft mold.

As the stamp SM is flexible, it can be pressed by a rolling machine R. When the stamp SM is pressed by using the rolling machine R, the stamp SM is brought into contact with the end of the first resin layer 120, such that the stamp SM may be pressed by the roll.

For example, the rolling machine R is started at a first beginning point BG1 that is an edge of the substrate 106, and is moved from the first area A1 toward a second area A2. In other words, the rolling machine R may start at the first beginning point BG1 and push the stamp SM toward a first end point DE1 of the moat M.

Although the first beginning point BG1 is the edge of the substrate 106 in the drawings, other arrangements are possible. For example, the moat M may be the first beginning point BG1. In other words, although only one moat M is shown in the drawings, more than one moat M may be provided. One of the moats M may be the first beginning point BG1. In this exemplary embodiment, the first beginning point BG1 is disposed at the edge of the substrate.

As described above, a pattern may be transferred to the first resin layer 120 in the first area A1 by using the rolling machine R and the stamp SM.

Figure 16:
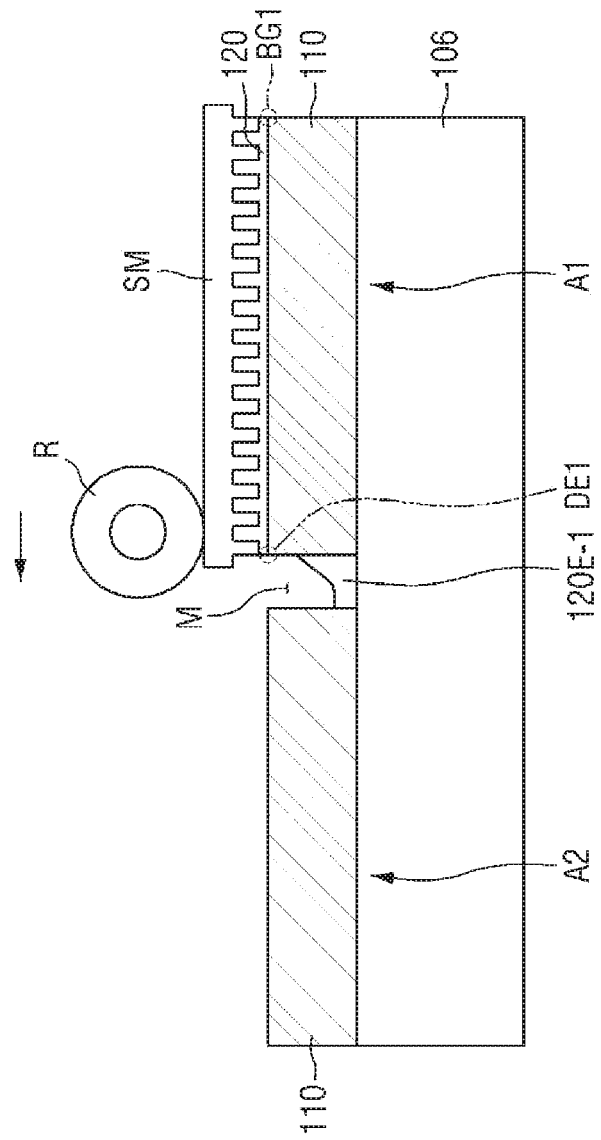

Referring to FIG. 16, as the stamp SM is pressed by using the rolling machine R from the first beginning point BG1 in the first area A1 toward the second area A2, the pattern of the stamp SM may be transferred to the first resin layer 120 in the first area A1.

As the first resin 120a is pressed, it fills the negative pattern of the stamp SM, and a part of the first resin 120a is pushed aside to become a first excessive resin 120E-1. If the amount of the first resin 120a is insufficient, the first resin 120a cannot fully fill the negative pattern of the stamp SM, resulting in a fault. For this reason, a sufficient amount of resin has to be applied, and accordingly the first excessive resin 120E-1 may be created.

As the stamping process using the stamp SM is carried out, the excessive resin may result in a defective pattern at the first beginning point BG1 and the first end point DE1 of the stamp SM. However, as the stamp SM is pushed by the roll machine R to the first end point DE1 where the moat M meets, a part of the first resin 120a may be introduced in the moat M at the first end point DE1 of the stamping process. Accordingly, the first resin 120a is introduced into the moat M, such that the first excessive resin 120E-1 can be removed from the surface of the first metal layer 110.

In this manner, the first end point DE1 of the stamp SM is aligned with the moat M, such that the first excessive resin 120E-1 may be introduced into the moat M. By doing so, the first excessive resin 120E-1 can be removed from the surface of the first metal layer 110, and thus a neat finish can be made at the first end point DE1 of the stamp SM.

Moreover, as the rolling machine R moves from the first beginning point BG1 in the first area A1 toward the second area A2, no excessive resin is formed at the first beginning point BG1 that is the edge of the substrate 106. In other words, as the rolling machine R presses the stamp SM from the first beginning point BG1 in the first area A1 toward the second area A2, it is also possible to prevent the first excessive resin 120E-1 from being created on the surface of the first metal layer 110 at the first beginning point BG1 that is the edge of the substrate 106, where the stamping by the stamp SM is started. Accordingly, the first excessive resin 120E-1 can not be created at the first beginning point BG1 of the stamp SM, and thus a neat finish can be made at the first beginning point BG1 of the stamp SM.

Figure 17:
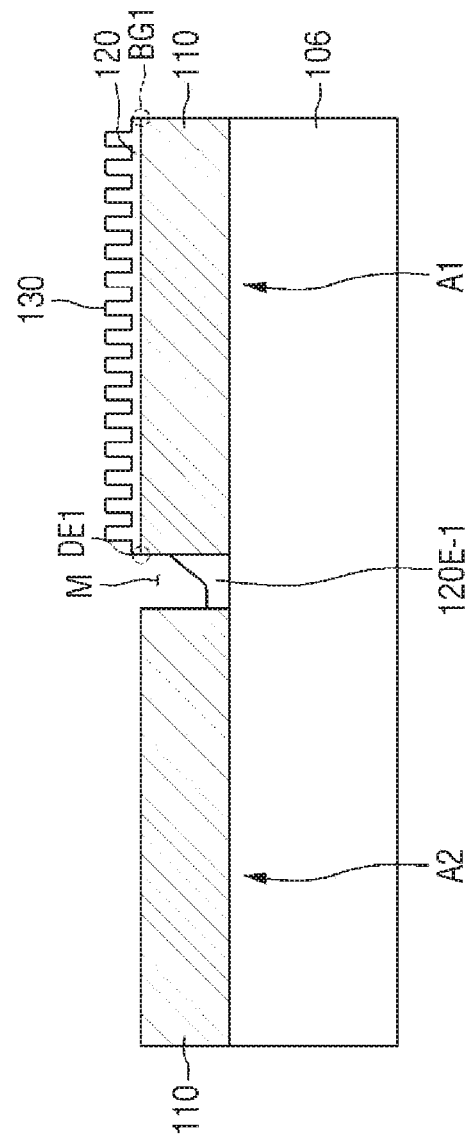

Referring to FIG. 17, the stamp SM is detached from the first resin layer 120. After the stamp SM is detached, a first resin pattern 130 may be formed on the first metal layer 110 in the first area A1. The first resin pattern 130 may be a periodic pattern extended in a direction.

Since a sufficient amount of the first resin 120a is applied on the first metal layer 110, the first resin layer 120 may be formed at a predetermined thickness after the stamping process.

On the other hand, on the surface of the first metal layer 110 in the first area A1, the first excessive resin 120E-1 is not formed at the first beginning point BG1 that is the edge of the substrate 106, where the stamp SM starts, such that a neat first resin pattern 130 can be formed. In addition, the first excessive resin 120E-1 is not formed at the moat M that is the first end DE1 of the stamp SM, either, and thus a neat first resin pattern 130 can be formed. In this regard, at the first end point DE1, the first excessive resin 120E-1 is introduced into the moat M, and thus the first resin pattern 130 can have a neat shape at the first end DE1.

Figure 18:
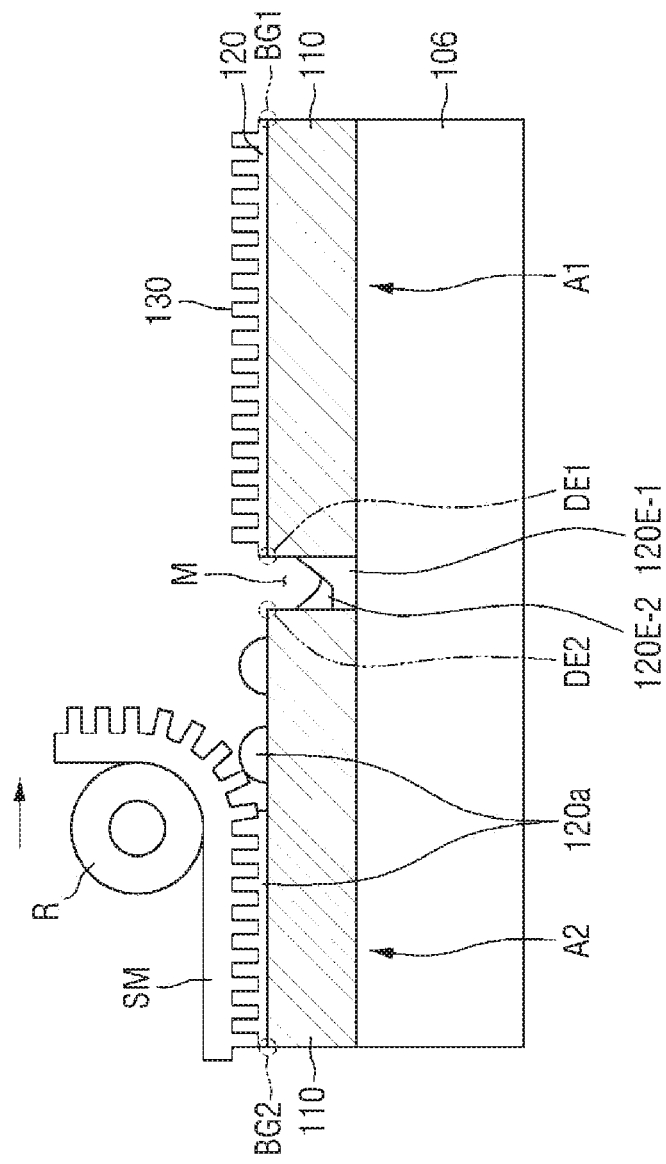
Figure 19:
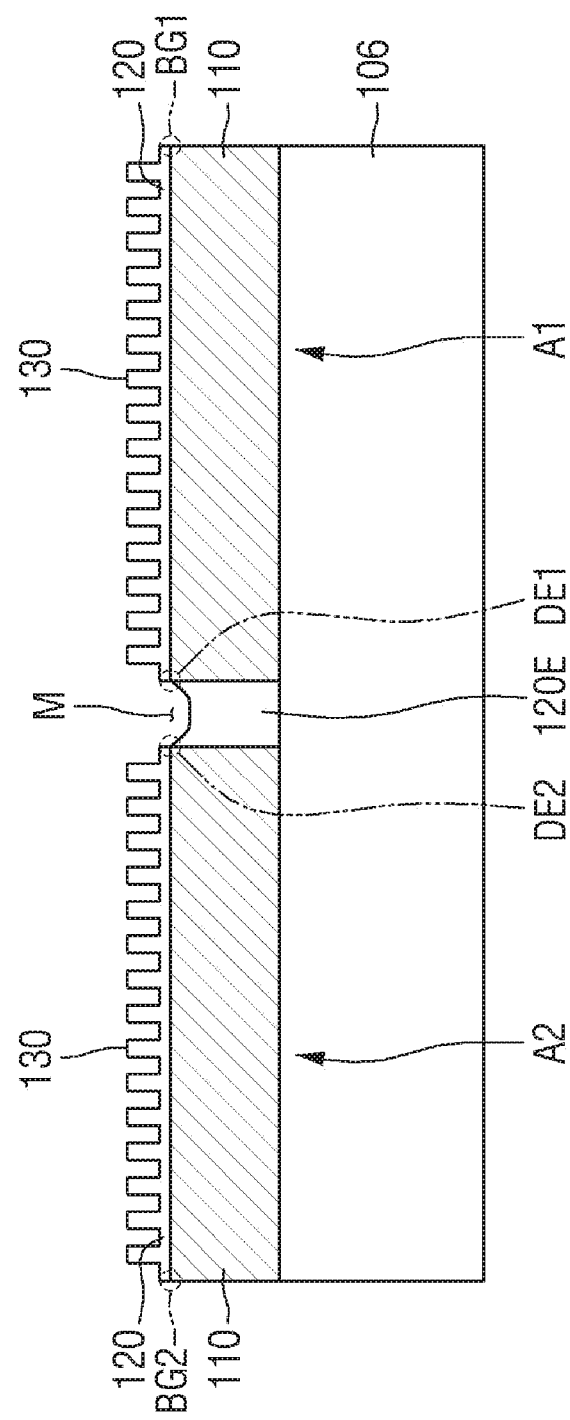

Referring to FIGS. 18 and 19, the first resin 120a is applied onto the first metal layer 110 in the second area A2, which is the opposite side to the first area A1 with respect to the moat M. The material and amount of the first resin 120a applied in the second area A2 may be equal to those of the first resin 120a applied in the first area A1. As the material and amount of the first resin 120a applied in the second area A2 are equal to those of the first resin 120a applied in the first area A1, the same reference numerals will be used to denote the like elements. However, the material and amount of the first resin 120a applied in the second area A2 may be different from those of the first resin 120a applied in the first area A1.

Subsequently, the first resin 120a spreads out over the first metal layer 110 in the second area A2, such that a first resin layer 120 is formed. Then, a stamp SM is placed on the first resin layer 120.

Similarly in the first area A1, when the stamp SM is pressed by using a rolling machine R, the rolling machine R is started at a second beginning point BG2 that is an edge of the substrate 106 and is moved from the second area A toward the first area A1. In other words, the rolling machine R may start at the second beginning point BG2 and push the stamp SM toward the second end point DE2 where the moat M is formed. The second beginning point BG2 is the edge of the substrate 106 and is the opposite end to the first beginning point BG1 shown in FIG. 15. Alternatively, the second beginning point BG2 may be another moat than the moat M shown in the drawing.

As described above, a pattern may be transferred to the first resin layer 120 in the second area A2 by using the rolling machine R and the stamp SM.

As the stamp SM is pressed by using the rolling machine R from the second beginning point BG2 in the second area A2 toward the first area A1, the pattern of the stamp SM may be transferred to the first resin layer 120 in the second area A2.

As the first resin 120a is pressed, it fills the negative pattern of the stamp SM, and a part of the first resin 120a is pushed aside to become a second excessive resin 120E-2. If the amount of the first resin 120a is insufficient, the first resin 120a cannot fully fill the negative pattern of the stamp SM, resulting in a fault. For this reason, a sufficient amount of resin has to be applied, and accordingly the second excessive resin 120E-2 may be created.

As such, as the stamping process using the stamp SM is carried out, the excessive resin may result in a defective pattern at the second beginning point BG2 and the second end point DE2 of the stamp SM. However, as the stamp SM is pushed by the roll machine R to the moat M, a part of the first resin 120a may be introduced in the moat M at the second end point DE2.

Accordingly, the second excessive resin 120E-2 resulted from the first resin 120a may be introduced into the moat M. As a result, the second excessive resin 120E-2 can be removed from the surface of the first metal layer 110.

In this manner, the second excessive resin 120E-2 is introduced into the moat M that is adjacent to the second end point DE2, a neat finish can be made at the second end point DE2 of the stamp SM.

Moreover, as the rolling machine R moves from the second beginning point BG2 in the second area A2 toward the first area A1, no excessive resin is formed at the second beginning point BG2 that is the edge of the substrate 106.

In other words, as the rolling machine R presses the stamp SM from the second beginning point BG2 in the second area A2 toward the first area A1, it is also possible to prevent the second excessive resin 120E-2 from being created on the surface of the first metal layer 110 at the second beginning point BG2 that is the edge of the substrate 106, where the stamping by the stamp SM is started.

Accordingly, the second excessive resin 120E-2 can not be created at the second beginning point BG2 of the stamp SM, and thus a neat finish can be made at the second beginning point BG2 of the stamp SM.

In addition, by performing the imprinting by pressing a roll repeatedly, a great amount of a residual resin 120E may be introduced in the moat M. As the first resin 120a may be used to form the first resin layer 120 by inkjet printing, it may be easy to adjust the amount of the first resin 120a. The residual resin 120E is pushed aside to be introduced into the moat M and thus may have its center portion lower than the side walls of the moat M (referring to FIG. 19).

Further, although the first and second end points DE1 and DE2 may be disposed at the single moat M such that the residual resin 120E may be introduced in the space of the moat M, the amount of the residual resin 120E, which are the first and second excessive resins 120E-1 and 120E-2 introduced in the moat M, can be adjusted by adjusting the amount of the first resin 120a by inkjet printing.

Accordingly, the thickness of the residual resin 120E introduced in the moat M may be adjusted to be similar to or less than the deposition thickness of the first metal layer 110. In some implementations, the residual resin 120E may be introduced in the moat M so that it is higher than the first metal layer 110. That is, there may be a difference between the height of the moat M and the height of the first resin pattern 130.

As such, the first resin pattern 130 is formed on the first metal layer 110 by a roll process, and the residual resin 120E may be formed in the moat M formed between the first area A1 and the second area A2.

As described above, by performing the imprinting by pressing a roll repeatedly, the first resin pattern 130 may be formed on the first metal layer 110. Although the first resin pattern 130 has been described as being formed on the first metal layer 110 in the same direction and at regular intervals on either sides of the moat M, other arrangements are possible. The first resin pattern 130 formed on one side of the moat M may have different directions and different intervals from the first resin pattern 130 formed on the other side of the moat M.

Figure 20:
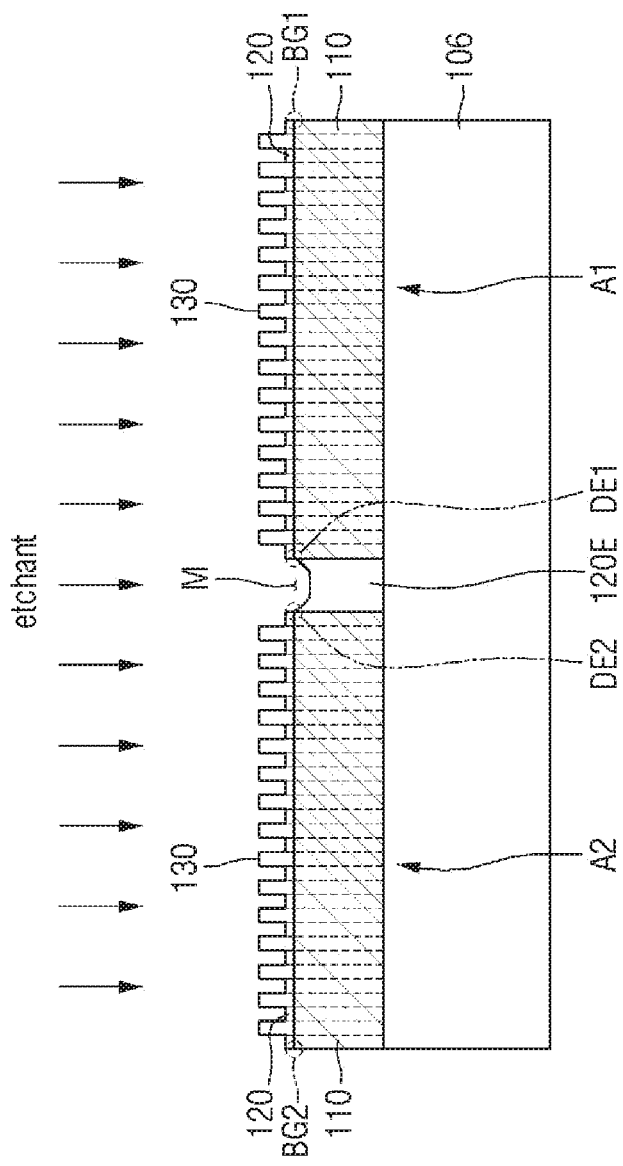

Referring to FIG. 20, the first metal layer 110 may be etched by using the first resin layer 120 as a mask, so that a wire grid pattern may be formed.

Specifically, on the substrate 106 where the first resin pattern 130 is formed, there may be a part of the first resin layer 120 covering the first metal layer 110 as well as the first resin pattern 130.

To remove the first resin layer 120 and/or the first metal layer 110, a passivation process by plasma etching may be carried out on the substrate where the first resin pattern 130 is formed. Plasma treatment may be performed for the passivation process by plasma etching. The plasma treatment may be, but is not limited to, $O_2$ plasma treatment using oxygen as the source gas. Specifically, by performing the $O_2$ plasma treatment, a part of the first resin pattern 130 and the first resin layer 120 covering the surface of the first metal layer 110 may be removed by ashing. In this manner, the $O_2$ plasma treatment may expose a part of the first metal layer 110 covered by the first resin layer 120. In addition, a part of the residual resin 120E introduced in the moat M may also be removed by ashing.

As described above, the exposed part of the first metal layer 110 may use the first resin pattern 130 as the mask. An etchant is applied onto the exposed part of the first metal layer 110 such that the exposed part may be etched out, leaving the first metal layer 110 disposed under the first resin pattern 130. Alternatively, dry etching may be carried out by using the first resin pattern 130 as the mask.

Figure 21:
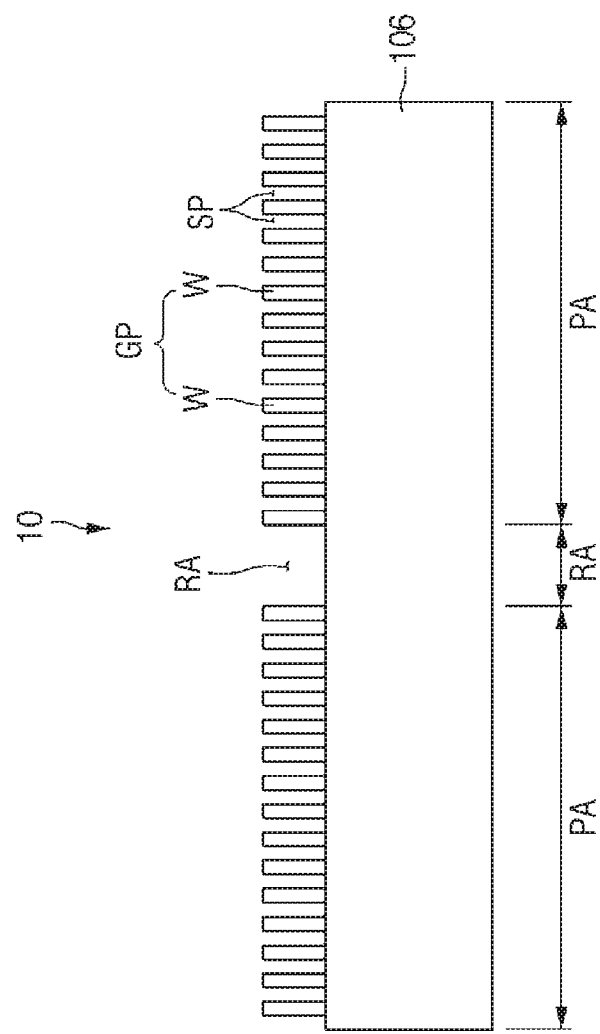

Referring to FIG. 21, the first resin pattern 130 and the exposed part of the first metal layer 110 may be etched, and the first resin pattern 130 may be removed, such that wires W having regular intervals may be formed on the substrate 106.

The wire grid pattern 100 may be formed by the above-described process. Next, an example where the wire grid pattern 100 is directly used as the wire grid polarizer 10 will be described.

The wire grid polarizer 10 may be formed on the substrate 106 such that the wires W have regular intervals. A part of the first metal layer 110 may be etched between the wires W such that the wires W may be spaced apart from one another. That is, the slits SP spaced apart from one another by a predetermined gap may be formed between the wires W.

In the wire grid polarizer 10, the area where the wires W and the slits SP separating the wires W from one another are disposed may be the transmissive area PA. In addition, a reflective area RA separating between the transmissive areas PA may be formed by removing the residual pattern 120E in the moat M. Although the reflective area RA shown in the drawing has a slit-like shape, other arrangements are possible. For example, the reflective area RA may be a reflective pattern.

The wire grid polarizer 10 shown in FIG. 21 may be described in association with the wire grid pattern 100 illustrated in FIG. 1 as follows: the transmissive areas PA of the wire grid polarizer 10 may correspond to the cells CE of the wire grid pattern 100, and the reflective area RA of the wire grid polarizer 10 may correspond to the trench area TA of the wire grid pattern 100.

As described above, according to the method for fabricating the wire grid polarizer 10 according to one or more exemplary embodiments, the residual resin 120E possibly created by repeating the steps with the stamp SM is introduced into the moat M, and thus it is possible to suppress a defective pattern resulted from the residual resin 120E.

In the same manner, in the method for fabricating the wire grid pattern 100 according to this exemplary embodiment, the wire grid polarizer 10 includes the wire patterns GP and the trench area TA including the sink pattern TS, and the reflection efficiency of the wire grid polarizer 10 can be increased while the transmittance and the polarization property can be improved.

Figure 22:
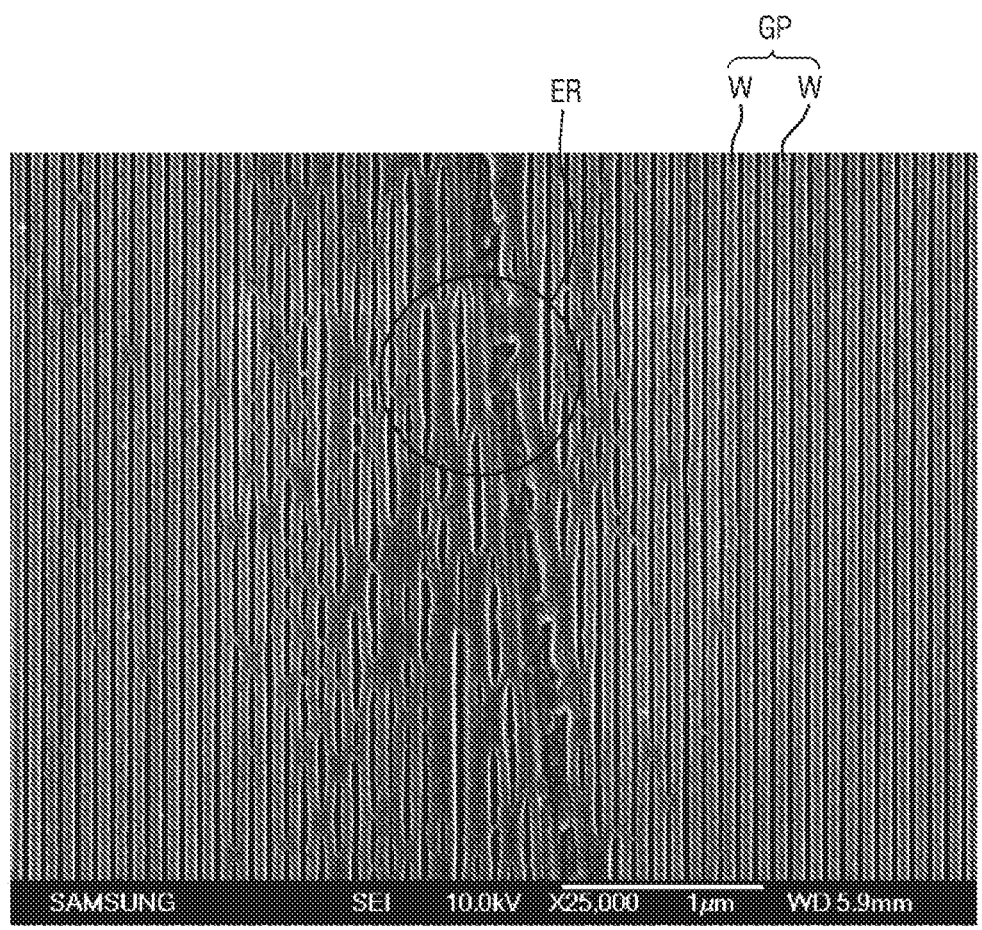
FIGS. 22 and 23 are images in cross-sectional view and in plan view of a substrate fabricated by existing imprinting steps according to Comparative Example.
Figure 23:
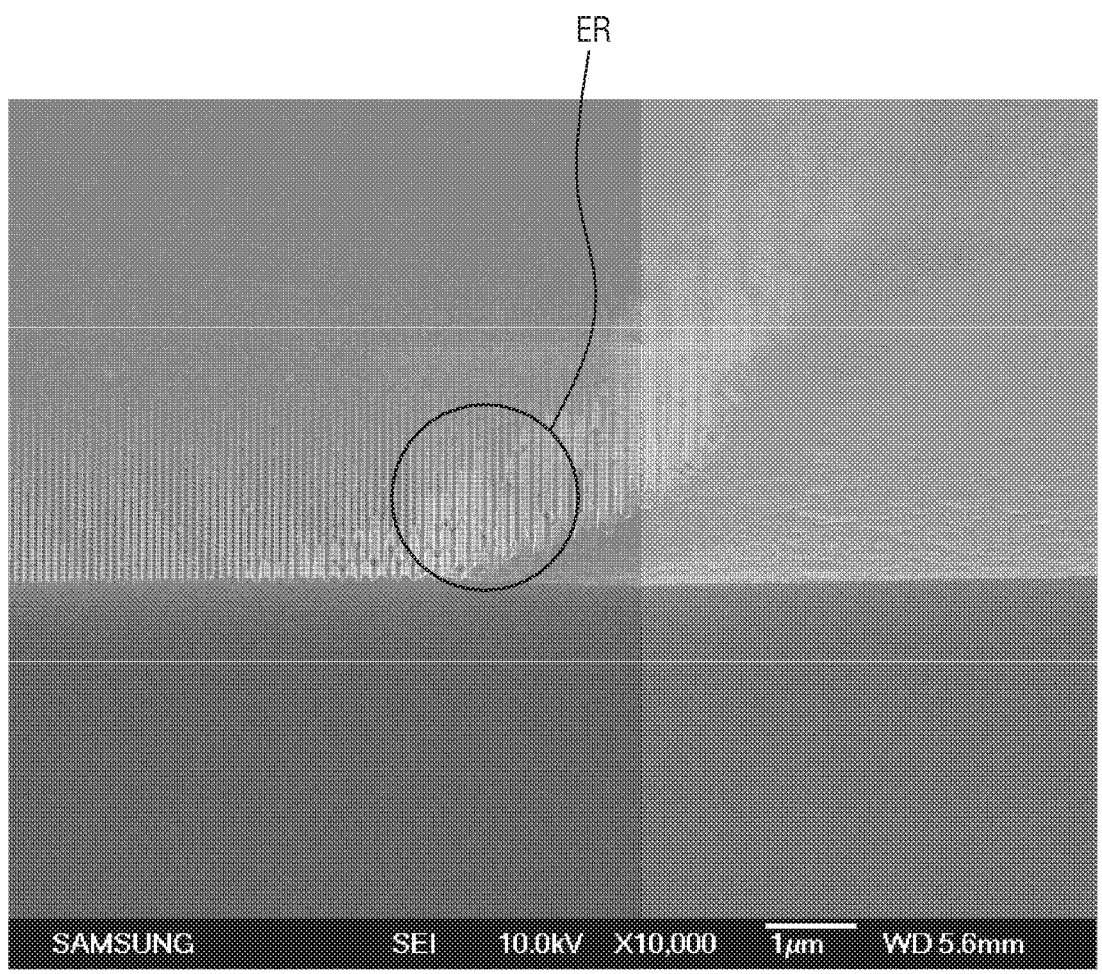
Figure 24:
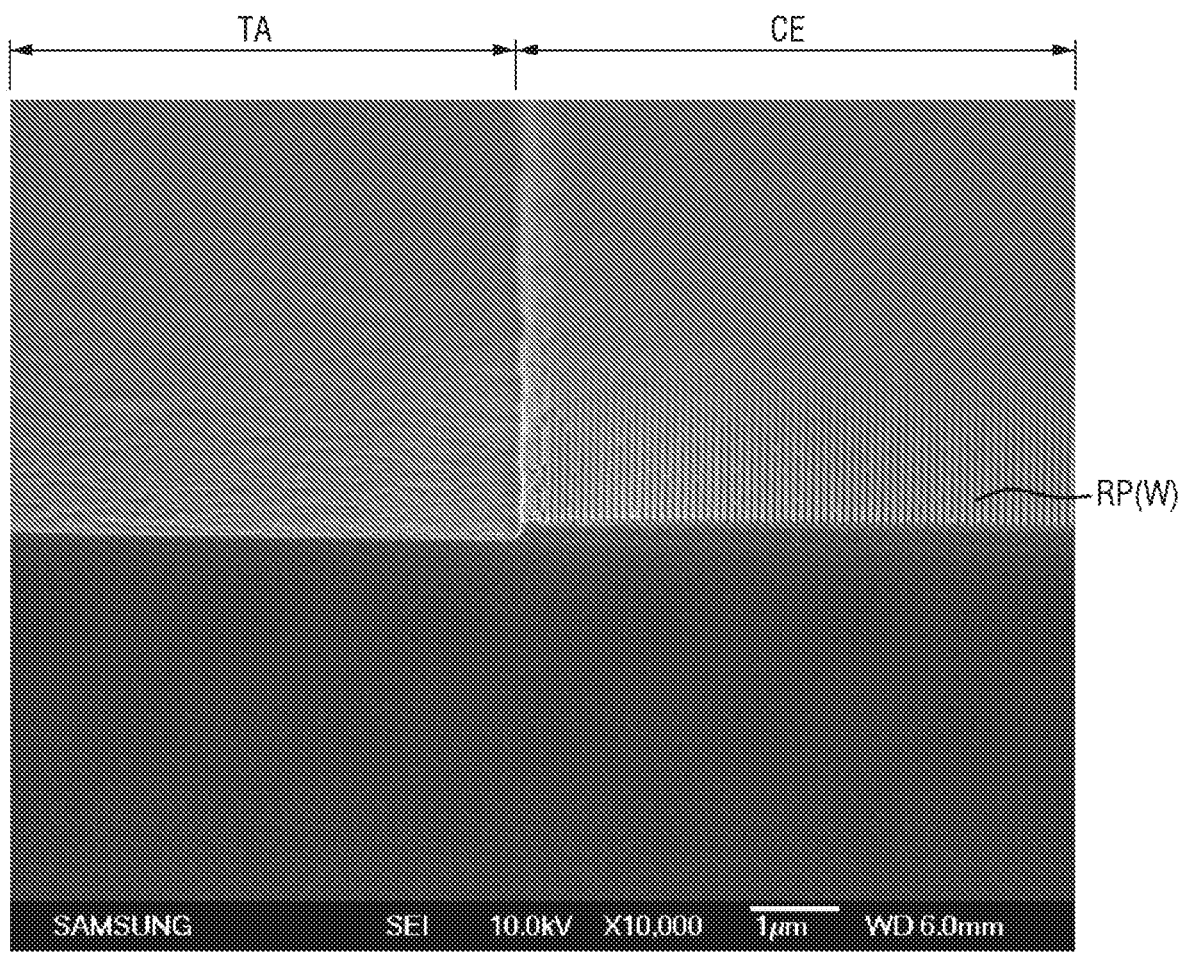
FIGS. 24 and 25 are images in cross-sectional view and in plan view of a substrate fabricated by imprinting with a moat according to the principles of the invention.
Figure 25:
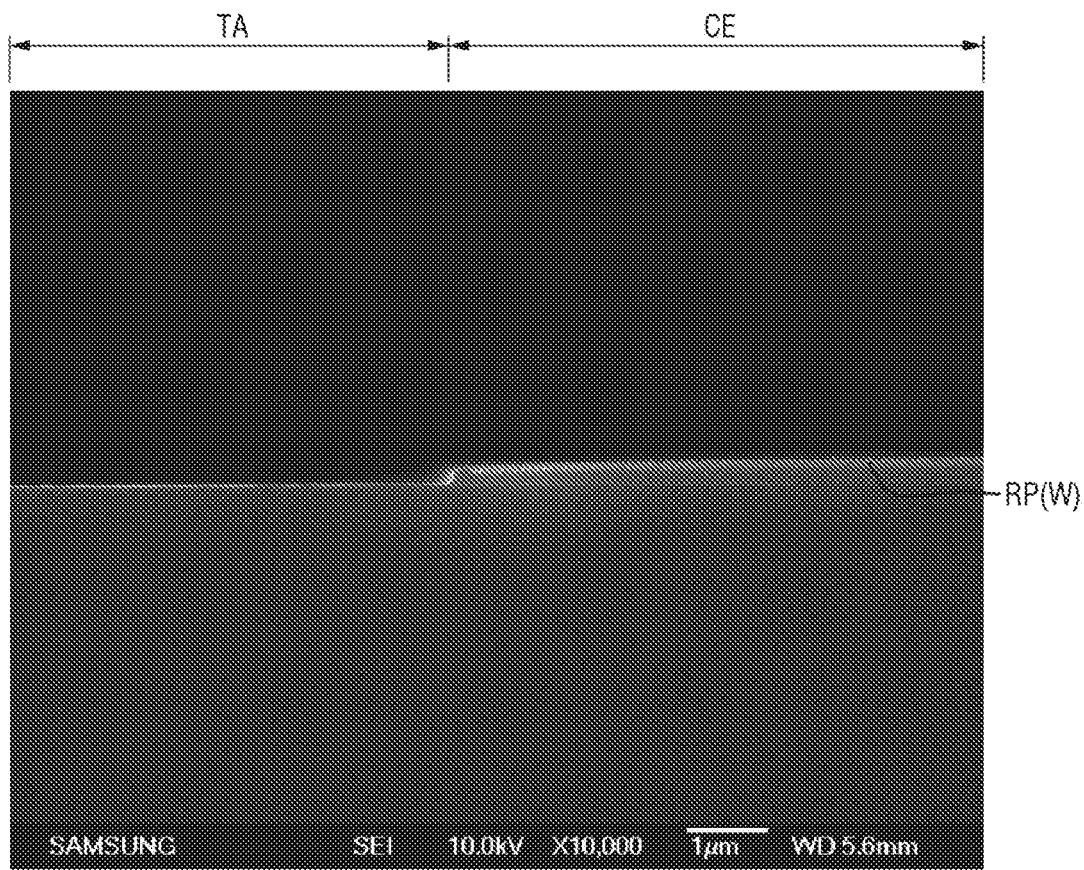

FIGS. 22 and 23 are images in cross-sectional view and in plan view of a substrate fabricated by existing imprinting steps according to Comparative Example. FIGS. 24 and 25 are images in cross-sectional view and in plan view of a substrate fabricated by imprinting with a moat according to the principles of the invention. In describing Comparative Example and the one or more exemplary embodiments shown in FIGS. 22-25, FIGS. 1 and 14 to 21 will be referenced to avoid redundancy and for ease of description.

Specifically, imprinting was carried out with no moat M in the first metal layer 110 in Comparative Example of FIGS. 22-23, whereas imprinting was carried out with the moat M in the first metal layer 110 in the exemplary embodiment of FIGS. 24-25.

As shown in FIGS. 22 and 23, a residual resin pattern ER may be created due to the first and second excessive resins 120E-1 and 120E-2 among the first resin 120a. The residual resin pattern ER may be formed between the wire patterns GP. That is, the residual resin pattern ER may be formed in the cells CE where the wire patterns GP are formed.

Specifically, when the wire grid pattern is formed by using a stamp SM in Comparative Example, stamp processes are repeatedly performed, and thus a boundary may be made inevitably between a first step and a second step. At the boundary, an excessive resin 120E may be created as the resin is pushed aside by the pressure delivered during the stamping processes. The excessive resin 120E may result in the residual pattern ER, and the residual resin pattern ER may be formed between the wire patterns GP to form a defective pattern. Such defective pattern formed by the residual resin pattern ER may degrade the transmittance and the polarization property.

In the stamping processes, residual resin is pushed aside during imprinting, such that the residual resin pattern ER may be formed at the edge of the wire grid pattern 100 as well as the boundary between steps. This may also result in the wire patterns GP with defective edge. Such defective pattern may degrade the transmittance and the polarization property.

In contrast, referring to FIGS. 24 and 25, it can be seen that an excessive resin 120E was introduced into the moat M formed between the cells CE, such that no defective pattern was created due to the excessive resin 120E.

It is considered that such effect is achieved by forming the area corresponding to the first and second ends DE1 and DE2, i.e., the moat M accommodating the excessive resin and accordingly the excessive resin 120E is removed from the first metal layer 110 to form a neat resin pattern 130 on the first metal layer 110. In addition, as the first and second beginning points BG1 and BG2 are also controlled along the direction in which the pressure is delivered, it is possible to suppress a defective pattern due to the excessive resin.

As described above, in methods for fabricating a wire grid pattern according to one or more exemplary embodiments, the excessive resin 120E is removed from the first metal layer 110 such that a neat resin pattern 130 is formed. As a result, the residual resin pattern ER due to the excessive resin 120E is suppressed, such that the wire grid polarizer 10 with improved transmittance and polarization property can be provided.

FIGS. 26 to 31 are cross-sectional views of exemplary processing steps of fabricating a large wire grid polarizer using the method for fabricating a wire grid pattern according to the principles of the invention. In describing the exemplary embodiments of FIGS. 26-31, FIGS. 3 and 14 to 21 will be referenced to avoid redundancy and for ease of description.

Initially, the steps shown in FIGS. 14 to 21 are repeatedly performed such that a large wire grid pattern may be formed. However, as a plurality of wire grid patterns 100 is formed via the repeated steps, a long processing time and a number of processing steps are required, which is inefficient.

Accordingly, instead of forming a large wire grid polarizer by repeating the steps of forming the wire grid polarizer 100, it is also possible to form a large wire grid pattern 100 and then use it as a master substrate. By using the large master substrate, it is possible to form the large wire grid pattern 100 or the large wire grid polarizer 10 in one step.

By doing so, fabricating time and cost can be saved. In addition, by using the large master substrate, a number of the large wire grid patterns 100 or the large wire grid polarizers 10 can be produced by a single imprinting process.

Figure 26:
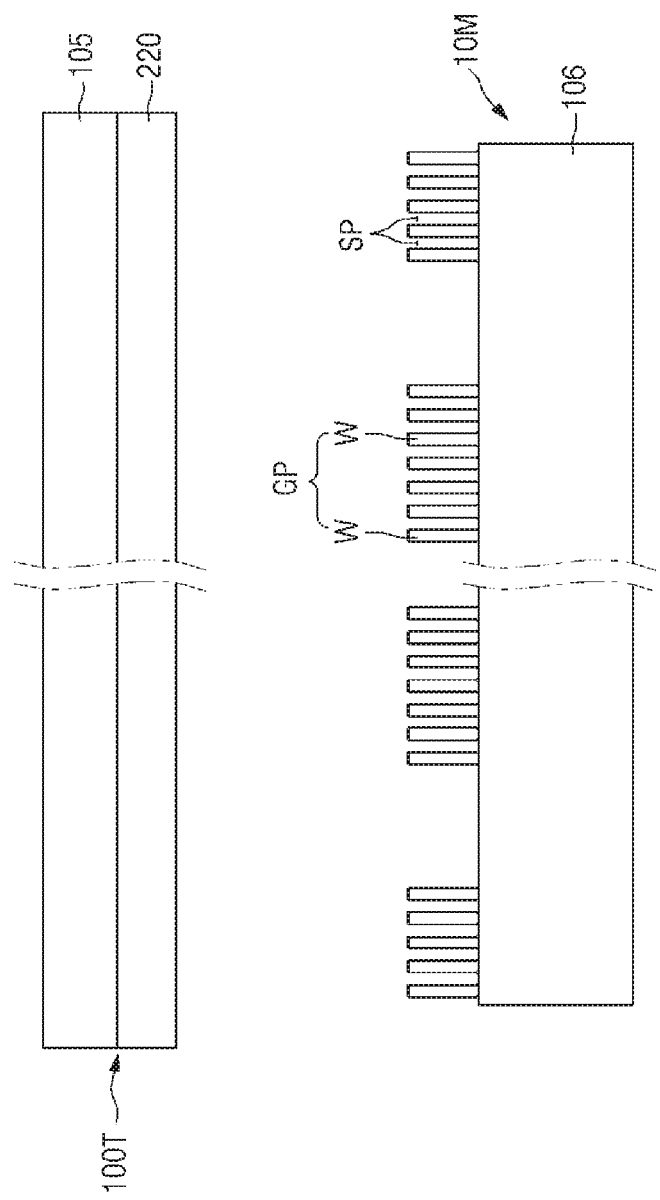
FIGS. 26 to 31 are cross-sectional views of exemplary processing steps of fabricating a large wire grid polarizer using the method for fabricating a wire grid pattern according to the principles of the invention.

Referring to FIG. 26, as shown in FIG. 21, a master substrate 10M is prepared, which includes a plurality of cells CE (corresponding to PA) and a trench area TA (corresponding to RA) separating between the cells CE. Each of the cells CE includes a wire pattern including a plurality of wires and slits separating between the wires on the substrate. The master substrate 10M may undergo imprint processes repeatedly, thereby forming a large master substrate.

In addition, a carrier substrate 100T is prepared, to which the pattern of the large master substrate 10M is transferred. The carrier substrate 100T may include a substrate 105, and a second resin layer 220 formed by applying a second resin onto the substrate 105. The second resin may be coated on the substrate 105 by inkjet printing, spin coating, slit coating, gravure coating, etc. The substrate 105 may be either a rigid substrate or a flexible substrate.

Figure 27:
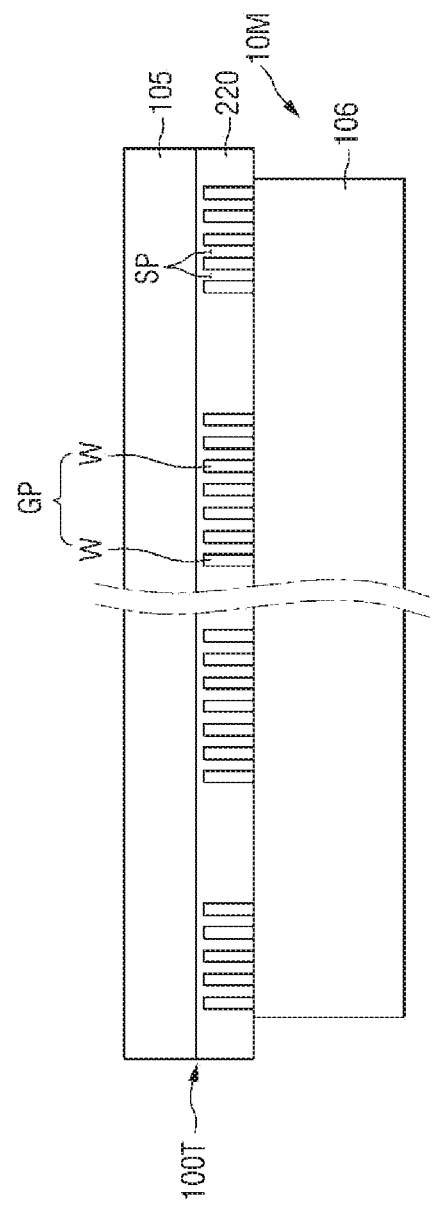

Referring to FIG. 27, the carrier substrate 100T having the second resin layer 220 is brought into contact with the large master substrate 10M.

By brining the master substrate 10M into contact with the carrier substrate 100T, the feature of the wire patterns GP of the large master substrate 10M may be transferred to the second resin layer 220 of the carrier substrate 100T. The feature of the wire patterns GP may be transferred to the second resin layer 220 by pressing with a rolling machine as described above. However, other arrangements are possible. For example, the feature of the wire patterns GP may be transferred to the second resin layer 220 by using osmosis or capillarity phenomenon as well.

A method of forming a pattern in the second resin layer 220 will be described with an example of nanoimprint lithography as a kind of contact manners. Wire patterns GP with negative/positive patterns is brought into contact with the second resin layer 220 of the carrier substrate 100T.

Osmosis or capillarity phenomenon may take place along the direction in which the negative fine pattern formed in the wire pattern GP is extended, i.e., the slit direction. The force of the osmosis or capillarity phenomenon can allow for mass transition in the second resin in the negative surface direction.

A part of the positive surfaces of the wire W in contact with the second resin may be subjected to surface treatment so that the positive surfaces have hydrophobic property to the second resin. The surface having hydrophobic property can further facilitate mass transition in the second resin.

In this manner, the mass transition in the second resin takes place in the slits SP of the wire pattern GP, which is the negative surface, and the carrier substrate 100T is detached from the large master substrate 10M, thereby forming a second resin pattern 230 to which the feature of the wire patterns GP is transferred.

Incidentally, even if the pattern is formed using a contact manner, the second resin may move to the trench area TA because the trench area TA is also formed in a negative pattern. As the trench area TA exists, the amount of the consumed second resin is increased, and thus the excessive resin can be suppressed.

Figure 28:
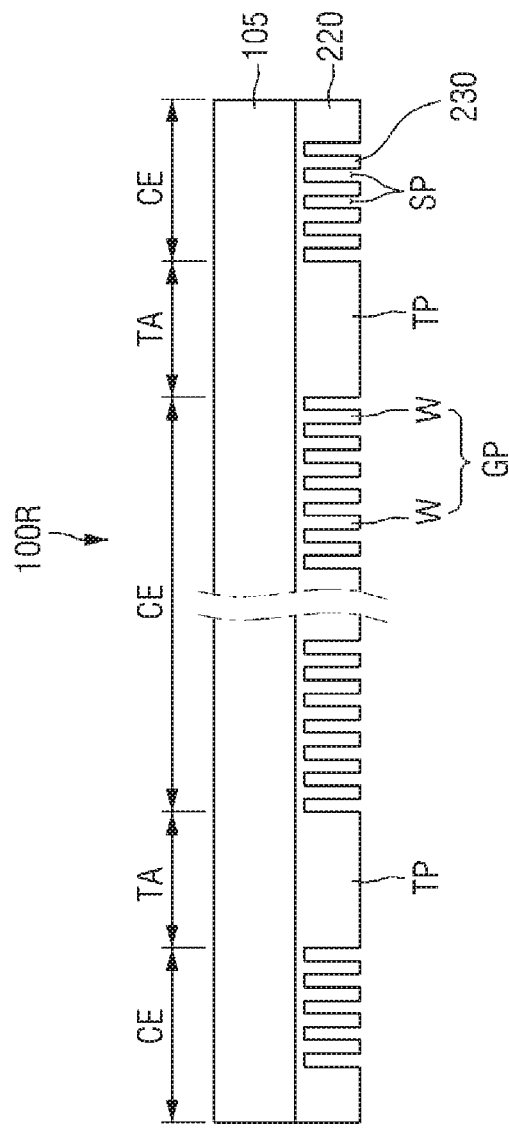

Referring to FIG. 28, the carrier substrate 100T is detached from the large master substrate 10M, such that a large replica substrate 100R can be formed. The large replica substrate 100R will be described with reference to FIG. 4 to avoid redundancy and for easy description.

The large replica substrate 100R includes wire patterns GP including wires W and slits SP separating the wires W from one another, and cells CE including a plurality of wire patterns GP. In addition, the large replica substrate 100R further includes a trench area TA that separate a cell CE from other adjacent cells CE. In this exemplary embodiment, the trench area TA may be a protruding pattern TP as shown in the drawings.

In this manner, the large replica substrate 100R can be formed by using the larger than master substrate 10M.

Figure 29:
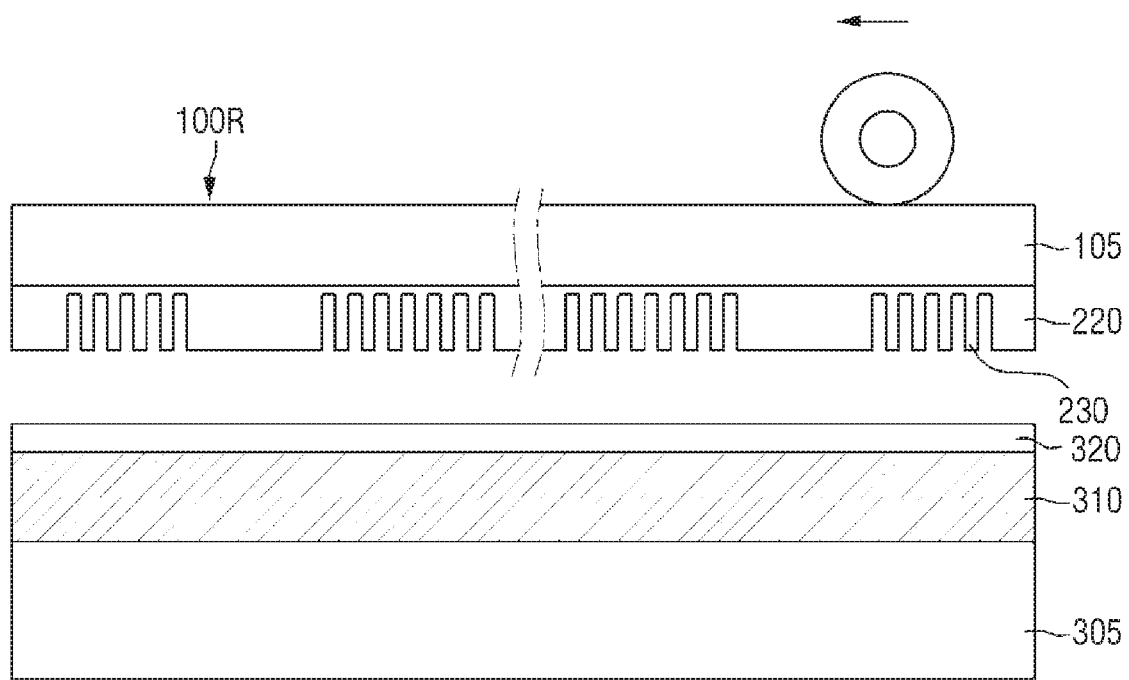

Referring to FIG. 29, a substrate 305 for forming a large wire grid polarizer is prepared. A second metal layer 310 may be disposed on the substrate 305. A third resin 320 may be applied on the second metal layer 310.

After the third resin 320 spreads out over the second metal layer 310, the large replica substrate 100R is brought into contact with the third resin layer 320, such that the feature of the second resin pattern 230 is transferred. The wire patterns GP and the protruding pattern TP may be transferred to the third resin layer 320.

Figure 30:
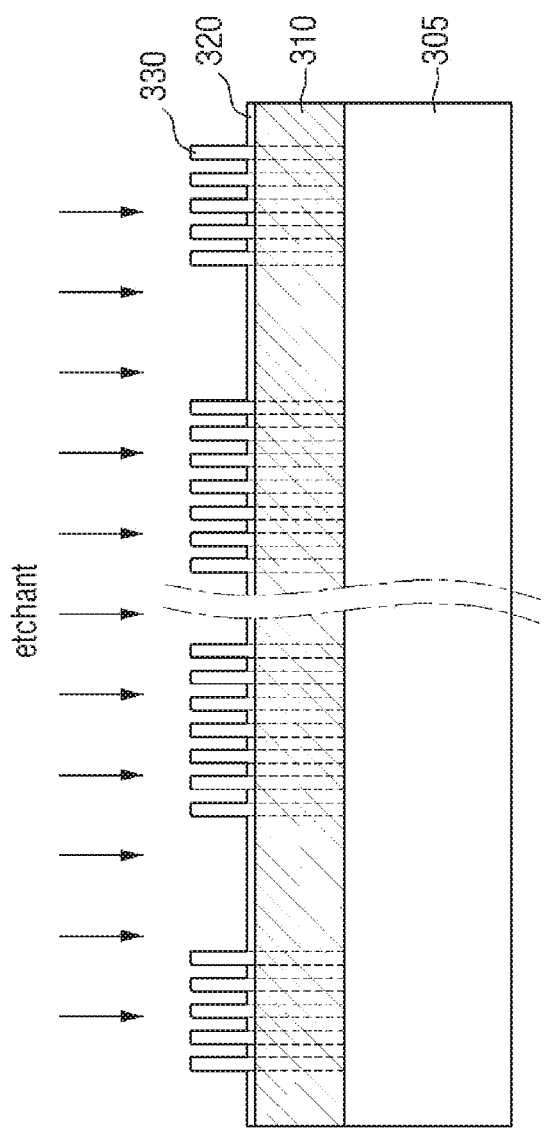

Referring to FIG. 30, the large replica substrate 100R is detached from the substrate 305, such that a third resin pattern 330 can be formed on the substrate 305. Some of the third resin layer 320 may remain on the second metal layer 310. In addition, the third resin pattern 330 may be formed on the third resin layer 320. The remaining part of the third resin layer 320 may be removed by ashing or the like, such that the second metal layer 310 can be exposed via the areas where the third resin pattern 330 is not formed.

Figure 31:
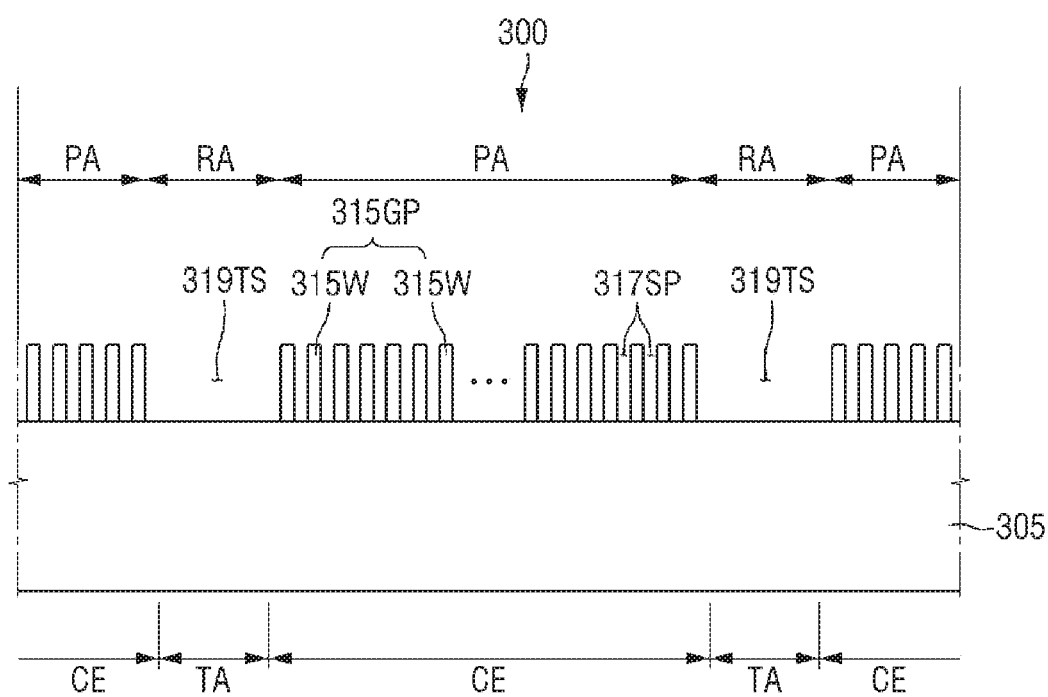

Referring to FIG. 31, the second metal layer 310 may be etched out by using the third resin pattern 330 formed on the substrate 305 as a mask. Subsequently, the third resin pattern 330 is removed. The wires W may be formed by using the second metal layer 310 remaining under the third resin pattern 330.

A large wire grid polarizer 300 includes cells CE including a plurality of wire patterns 315GP, and each of the wire patterns 315GP includes wires 315W and slits 317SP separating the wires 315W from one another. The cells CE may be disposed in line with the transmissive area PA.

In addition, the trench area TA of the wire grid polarizer 300 that separates between the cells CE may be disposed in line with the reflective area RA. In this exemplary embodiment, a sink pattern 319TS is shown.

According to this exemplary embodiment, it is possible to simply form the large wire grid polarizer 300 by performing single imprinting. According to this exemplary embodiment, the large replica substrate 100R can be formed, which reduces a defective pattern resulted from residual resin possibly occurring during a fabricating process. By using the large replica substrate 100R, the large wire grid polarizer 300 can be formed by performing single imprinting.

In addition, the trench area for reducing residual resin may be disposed in line with the non-transmissive area and used as a reflective pattern, thereby increasing the reflection efficiency. In the transmissive area, the possibility of a defective pattern due to residual resin is eliminated, thereby improving transmittance and polarization property.

Figure 32:
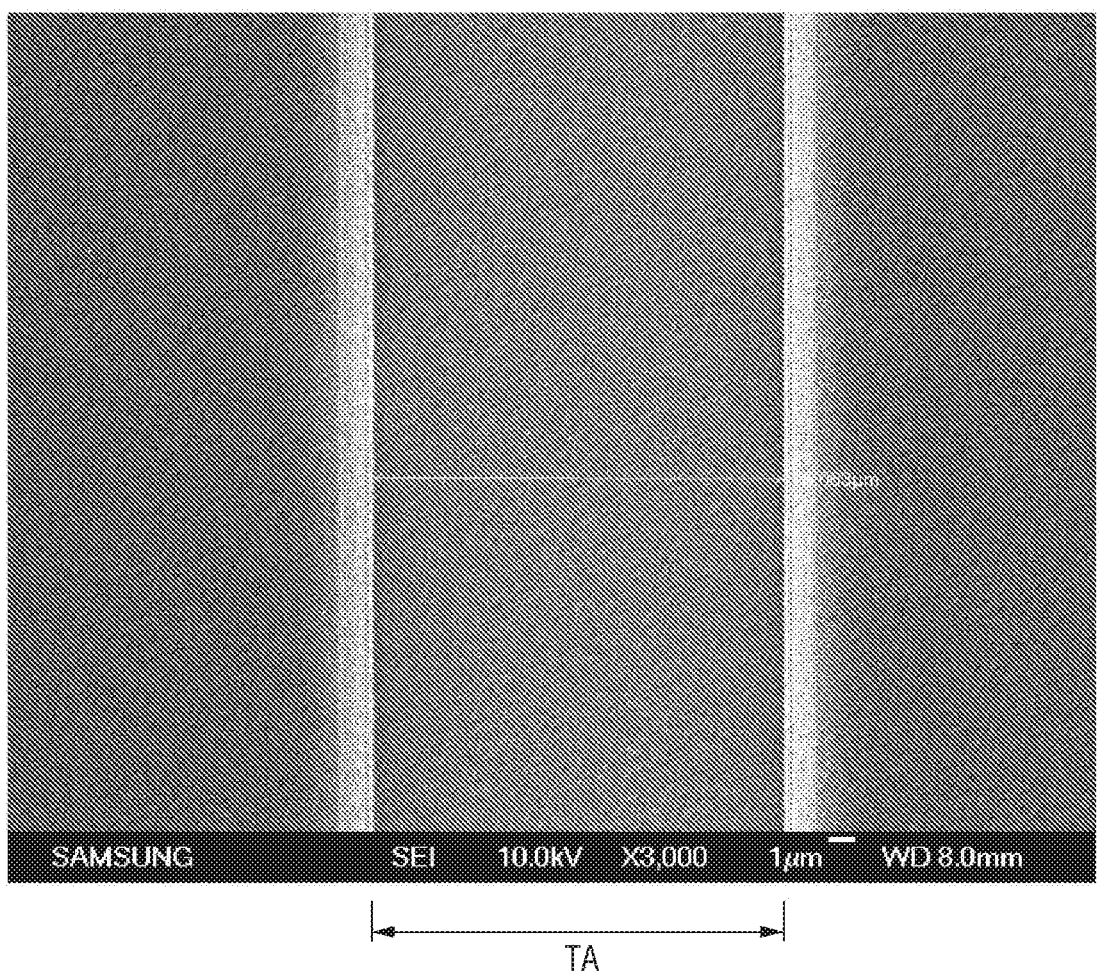
FIG. 32 is an image in plan view of a substrate where a wire grid pattern according to one or more exemplary embodiments is formed.
Figure 33:
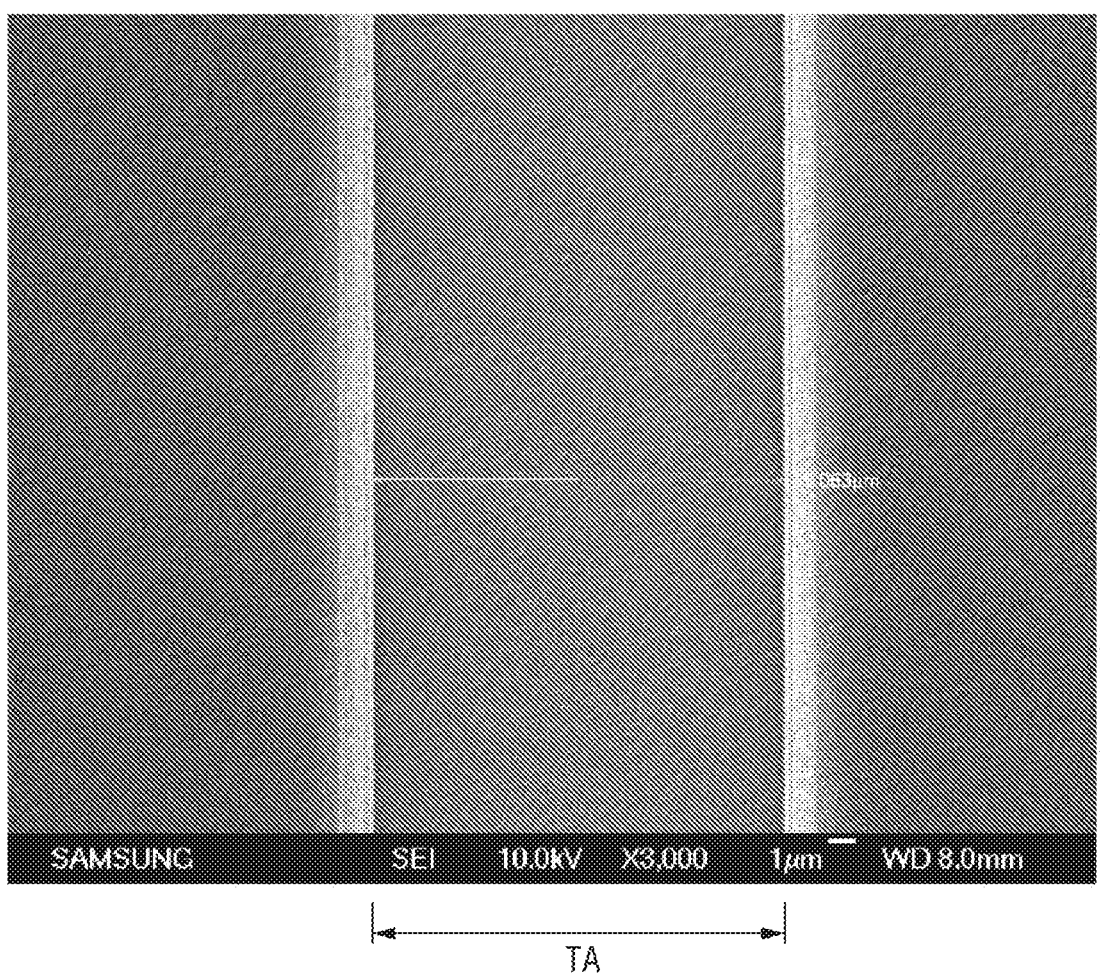
FIG. 33 is an image in cross-sectional view of the substrate where the wire grid pattern according to one or more exemplary embodiments is formed.

FIG. 32 is an image in plan view of a substrate where a wire grid pattern according to one or more exemplary embodiments is formed. FIG. 33 is an image in cross-sectional view of the substrate where the wire grid pattern according to one or more exemplary embodiments is formed. The image of FIG. 33 was taken before the third resin 330 was removed.

It can be seen from FIGS. 32 and 33 that the residual resin 120E is suppressed around the trench area TA, and thus a neat pattern is formed around the trench area TA.

As a result, the reflection efficiency can be increased in the non-transmissive area of the wire grid polarizer while transmittance and polarization property can be improved in the transmissive area thereof.

Figure 34:
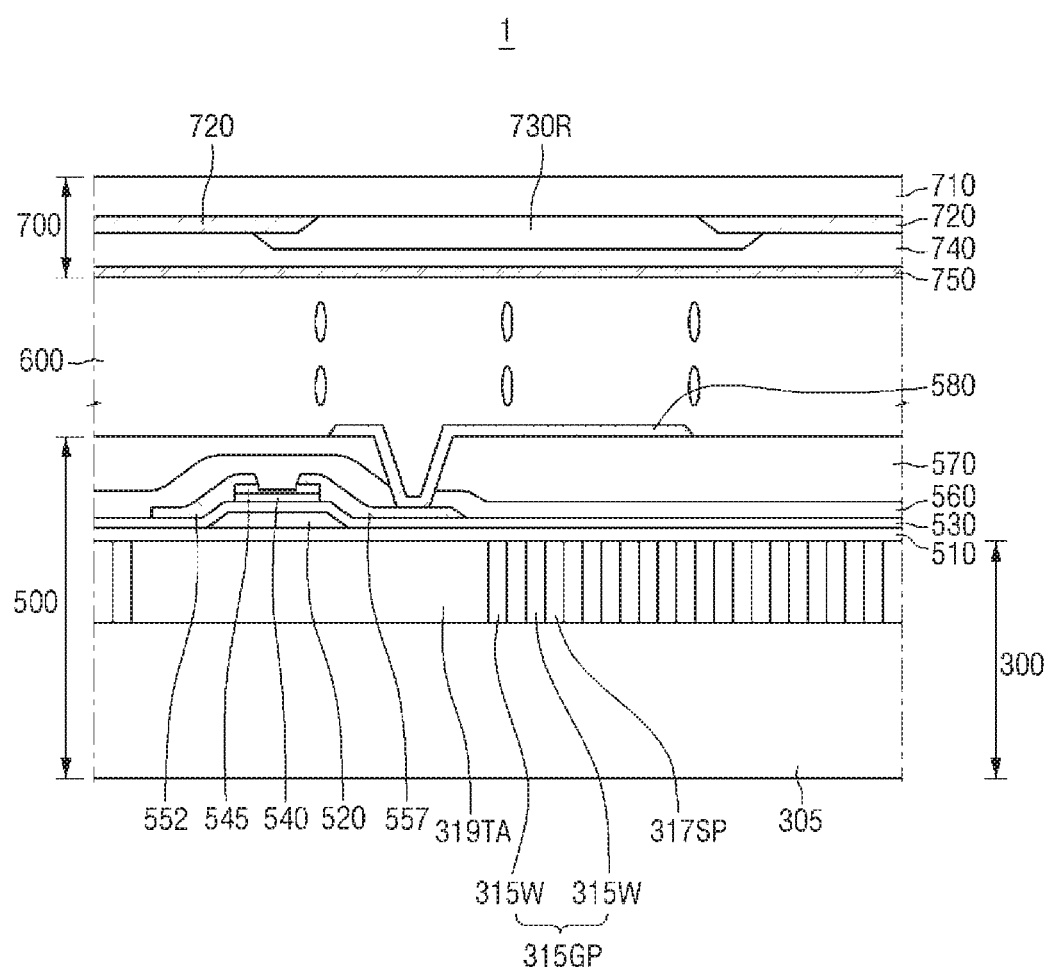
FIG. 34 is a cross-sectional view of a display device including a wire grid polarizer constructed according to the principles of the invention.

FIG. 34 is a cross-sectional view of a display device including a wire grid polarizer constructed according to the principles of the invention. The wire grid polarizer will be described with reference to FIGS. 1 to 32.

Referring to FIG. 34, the display device 1 may include a first display substrate 500, a second display substrate 700 spaced apart from and facing the first display substrate 500, and a liquid crystal layer 600 interposed between the first display substrate 500 and the second display substrate 700.

A plurality of pixels arranged in a matrix may be defined in each of the display substrates 500 and 700.

In the first display substrate 500, a plurality of gate lines extending in a first direction, and a plurality of data lines extending in a second direction perpendicular to the first direction may be formed. In each of pixels defined by the gate lines and the data lines, a pixel electrode 580 may be disposed.

The pixel electrode 580 may receive a data voltage via a thin-film transistor working as a switching element. A gate electrode 520 of the thin-film transistor, i.e., a control terminal may be connected to the gate line, a source electrode 552 thereof, i.e., an input terminal may be connected to the data line, and a drain electrode 557 thereof, i.e., an output terminal may be connected to the pixel electrode 580 via a contact hole. A channel of the thin-film transistor may be formed as a semiconductor layer 540. An ohmic contact layer 545 having a high work function may be further disposed between the semiconductor layer 540 and the source/drain electrodes 552 and 557. The ohmic contact layer 545 may have the high work function by doping a dopant into the semiconductor layer 540.

The semiconductor layer 540 may be disposed so that it overlaps the gate electrode 520. The source electrode 552 may be spaced apart from the drain electrode 557 with the semiconductor layer 540 therebetween. The pixel electrode 580, along with a common electrode 750, may generate electric field so as to control orientations of liquid crystal molecules in a liquid-crystal layer 600 interposed therebetween. The liquid-crystal layer 600 may be, but is not limited to, twisted nematic (TN) mode having a positive dielectric anisotropy, a vertical alignment (VA) mode or a horizontal alignment mode (IPS, FFS).

In the second display substrate 700, a color filter 730 may be formed in each pixel. The color filter 730 may include a red, green or blue color filter 230. The red, green, blue color filters 730 may be arranged in a repeated sequence. At a boundary between every two color filters 730, a shield pattern 720 may be disposed. Further, the shield pattern 720 may be extended to an inactive area of the second display substrate 700. In the second display substrate 700, the common electrode 750 may be disposed across pixels, as a single piece.

Hereinafter, the above-described display device 1 will be described in more detail.

The first display substrate 500 may use a wire grid polarizer substrate 105 having the wire grid polarizer 300 as a base substrate. In the following description, the wire grid polarizer 300 shown in FIG. 4 will be described as an example. However, it is to be noted that the wire grid polarizers according to other exemplary embodiments may also be used.

The substrate 305 may be made of a transparent, insulative substrate such as glass or transparent plastic substrate.

The wire grid polarizer 300 may include a wire grid pattern 315GP protruding from the substrate 305. A protective layer 510 may be formed above the substrate 305 to protect and insulate the wire grid pattern 315GP.

The wire grid polarizer 300 may include a transmissive area PA and a reflective area RA. The transmissive area PA of the wire grid polarizer 300 may include the wire grid pattern 315GP arranged in a regular nano pattern on the substrate 305, and slits 317SP separating the wire grid patterns 315GP. The reflective area may include a reflective pattern 319TA.

The transmissive area PA may be disposed in line with the aperture area of the display device. The reflective area RA may be disposed in line with the non-aperture area of the display device. Accordingly, the reflective pattern 319TA of the wire grid polarizer 300 is disposed in the area where thin-film transistors, gate lines, data lines, etc., are disposed, through which light cannot transmit, such that transmittance and polarizer efficiency can be improved. As a result, the luminance of the display device 1 can be increased.

On the protective layer 510 of the wire grid polarizer 300, a gate line made of a conductive material and a gate electrode 520 protruding from it may be formed. Although not shown in the drawings, the gate line may be extended to the inactive area and may form a gate pad in the inactive area.

The gate line and the gate electrode 520 are covered by a gate insulating layer 530.

On the gate insulating film 530, a semiconductor layer 540 and an ohmic contact layer 545 may be formed. On the semiconductor layer 540 and the ohmic contact layer, a source electrode 552 branching off from the data line, and a drain electrode 557 spaced apart from the source electrode 552 may be formed. Although not shown in the drawings, the data line may be extended to the inactive area and may form a data pad in the inactive area.

On the source electrode 552 and the drain electrode 557, a passivation film 560 may be formed that is a type of insulating films made of an insulative material, such as silicon nitride film, silicon oxide film and silicon oxynitride film. On the passivation film 560, an organic film 570 made of an organic material may be formed. The passivation film 560 and the organic film 570 may be extended to the inactive area. The passivation film 560 may be eliminated.

The pixel electrode 580 made of a conductive material may be formed on the organic film 570 in every pixel. The pixel electrode 580 may be electrically connected to the drain electrode 557 via a contact hole that penetrates the organic film 570 and the passivation film 560 to expose the drain electrode 557. The pixel electrode 580 may be made of indium tin oxide, indium zinc oxide, indium oxide, zinc oxide, tin oxide, gallium oxide, titanium oxide, aluminum, silver, platinum, chrome, molybdenum, tantalum, niobium, zinc, magnesium, an alloy thereof or a stack of layers thereof.

Subsequently, the second display substrate 700 will be described. The second display substrate 700 may have a second substrate 710 as its base substrate. The second substrate 710 may be made of a transparent, insulative substrate such as glass or transparent plastic substrate.

On the second substrate 710, a shield pattern 720 is formed. The shield pattern 720 may be extended to the inactive area.

On the shield pattern 720 in the active area, a color filter 730 may be formed.

On the color filter 730 and the shield pattern 720, an overcoat layer 740 may be formed. The overcoat layer 740 may be extended to the inactive area.

On the overcoat layer 740, the common electrode 750 may be disposed. The common electrode 750 may be made of indium tin oxide, indium zinc oxide, indium oxide, zinc oxide, tin oxide, gallium oxide, titanium oxide, aluminum, silver, platinum, chrome, molybdenum, tantalum, niobium, zinc, magnesium, and an alloy thereof or a stack of layers thereof.

The common electrode 750 may cover the entirety of the active area. The common electrode 750 may include a slit or an opening in the active area.

The common electrode 750 may be formed on a part of the inactive area, but is not formed at the periphery of the second display substrate 700 so that the overcoat layer 740 may be exposed.

The first display substrate 500 and the second display substrate 700 are disposed facing each other with a predetermined cell gap therebetween. The liquid-crystal layer 600 may be interposed between the first display substrate 500 and the second display substrate 700. Although not shown in the drawings, an alignment film may be formed on a surface of the first display substrate 500 and/or the second display substrate 700 in contact with the liquid-crystal layer 600. The pixel electrode 580 of the first display substrate 500 may face the common electrode 750 of the second display substrate 700 to generate electric field across the liquid-crystal layer 600.

As described above, the wire grid polarizer 300 is made of a metal and thus has very high reflection efficiency. Accordingly, the reflected light can be reflected again. Accordingly, by reusing the light, all of the lights can become a single polarization light. By applying the wire grid polarizer 10 to the display device 1, the transmittance and the polarization efficiency can be increased, and the luminance can be improved.

As described above, the wire grid polarizer substrate 105 uses a metal and thus has very high reflection efficiency. Accordingly, the reflected light can be reflected again. Accordingly, by reusing the light, all of the lights can become a single polarization light. By applying the wire grid polarizer substrate 105 to the display device 1, the transmittance and the polarization efficiency can be increased, and the luminance can be improved.

Although certain exemplary embodiments and implementations have been described herein, other embodiments and modifications will be apparent from this description. Accordingly, the inventive concepts are not limited to such embodiments, but rather to the broader scope of the presented claims and various obvious modifications and equivalent arrangements.

What is claimed is:

1. A wire grid pattern used as a wire grid polarizer included in a display device or a master substrate for fabricating the wire gird polarizer, the wire grid pattern comprising:
   a substrate;
   a cell area having a plurality of cells, each of the plurality of cells having a plurality of wires protruding from the substrate and arranged in a substantially parallel relationship at regular intervals; and
   a bezel area disposed along a periphery of the cell area,
   wherein the cell area comprises a trench area separating at least some of the cells from each other, the trench area comprises a sink-protruding pattern having a projecting portion extending upwardly from the surface of the substrate and a recessed portion extending downwardly from the top surface of the wires, and
   wherein the sink-protruding pattern comprises a first sink-protruding pattern disposed generally parallel to the wires and a second sink-protruding pattern intersecting the first sink-protruding pattern.

2. The wire grid pattern of claim 1, wherein at least some of the cells further includes slits separating adjacent wires by a predetermined spacing.

3. The wire grid pattern of claim 2, wherein a line width of the wires ranges from about 40 nm to about 50 nm, a spacing between the slits ranges from about 40 nm to about 50 nm, and a pitch that is a sum of the line width and the spacing ranges from about 80 nm to about 100 nm.

4. The wire grid pattern of claim 1, wherein:
the projecting portion of the sink-protruding pattern is connected to a side surface of an adjacent wire and connected to at least one end of each of the wires in the longitudinal direction, and
the recessed portion of the sink-protruding pattern separates at least some of the cells with the projecting portion therebetween and separates at least one end of the wires in the longitudinal direction from another.

5. The wire grid pattern of claim 1, further comprising:
a bank area disposed on at least a part of an area between the cell area and the bezel area.

6. The wire grid pattern of claim 5, wherein the bank area is connected to ends of the wires in the outermost cells of the cell area in a longitudinal direction, and a width of the bank area is substantially equal to or larger than a width of the trench area.

7. The wire grid pattern of claim 1, wherein the first sink-protruding pattern comprises a vertical projection and the second sink-protruding pattern comprises a horizontal projection.

8. The wire grid pattern of claim 1, wherein the first sink-protruding pattern directly contacts a side of at least one of the plurality of wires.

* * * * *